United States Patent
Ueyama

(10) Patent No.: US 8,345,181 B2
(45) Date of Patent: Jan. 1, 2013

(54) LIGHT EMITTING DEVICE AND LIQUID CRYSTAL DISPLAY DEVICE

(75) Inventor: Munetoshi Ueyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 184 days.

(21) Appl. No.: 12/936,684

(22) PCT Filed: Apr. 7, 2009

(86) PCT No.: PCT/JP2009/057086
§ 371 (c)(1),
(2), (4) Date: Oct. 7, 2010

(87) PCT Pub. No.: WO2009/139236
PCT Pub. Date: Nov. 19, 2009

(65) Prior Publication Data
US 2011/0025945 A1 Feb. 3, 2011

(30) Foreign Application Priority Data
May 13, 2008 (JP) ................................. 2008-125998

(51) Int. Cl.
*G02F 1/1333* (2006.01)
(52) U.S. Cl. ............................................. 349/58
(58) Field of Classification Search .............. 349/58, 349/68
See application file for complete search history.

(56) References Cited

U.S. PATENT DOCUMENTS

| | | | |
|---|---|---|---|
| 6,108,060 A | 8/2000 | Funamoto et al. | |
| 7,365,730 B2* | 4/2008 | Suzuki | ......................... 345/102 |
| 2004/0119418 A1 | 6/2004 | Moon | |
| 2006/0072343 A1 | 4/2006 | Shimizu | |
| 2008/0211761 A1 | 9/2008 | Morimoto | |

FOREIGN PATENT DOCUMENTS

| | | |
|---|---|---|
| EP | 0 733 927 A2 | 9/1996 |
| EP | 0 869 388 B1 | 1/2004 |
| JP | 2000-182793 A | 6/2000 |
| JP | 2001-195639 A | 7/2001 |
| JP | 2004-86046 A | 3/2004 |
| JP | 2004-200172 A | 7/2004 |
| JP | 2006-153954 A | 6/2006 |
| RU | 2 159 962 C1 | 11/2000 |
| RU | 2 322 705 C1 | 4/2008 |
| WO | 2006/137132 A1 | 12/2006 |

OTHER PUBLICATIONS

Official Communication issued in International Patent Application No. PCT/JP2009/057086, mailed on Jul. 14, 2009.

* cited by examiner

*Primary Examiner* — James Dudek
(74) *Attorney, Agent, or Firm* — Keating & Bennett, LLP

(57) ABSTRACT

A fluorescent tube (LP1) and a fluorescent tube (LP2) in a liquid crystal display device (79) emit light when the tubes are positioned at turning angles within a prescribed range to a hold pedestal (59). A fluorescent tube (LP3) and a fluorescent tube (LP4) also emit light when the tubes are positioned at prescribed turning angles within the prescribed range to the hold pedestal (59).

11 Claims, 15 Drawing Sheets

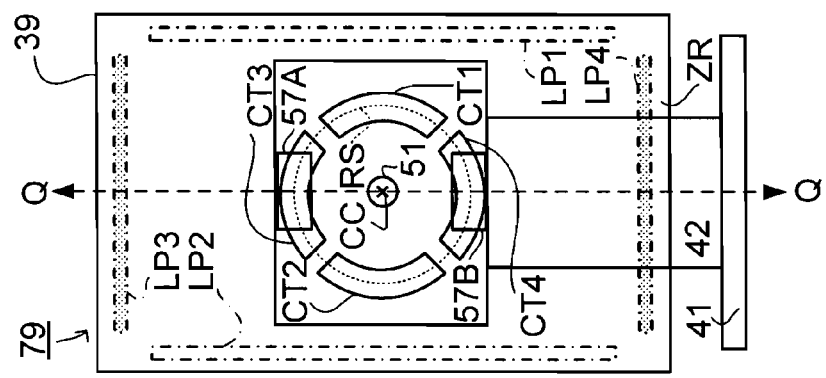
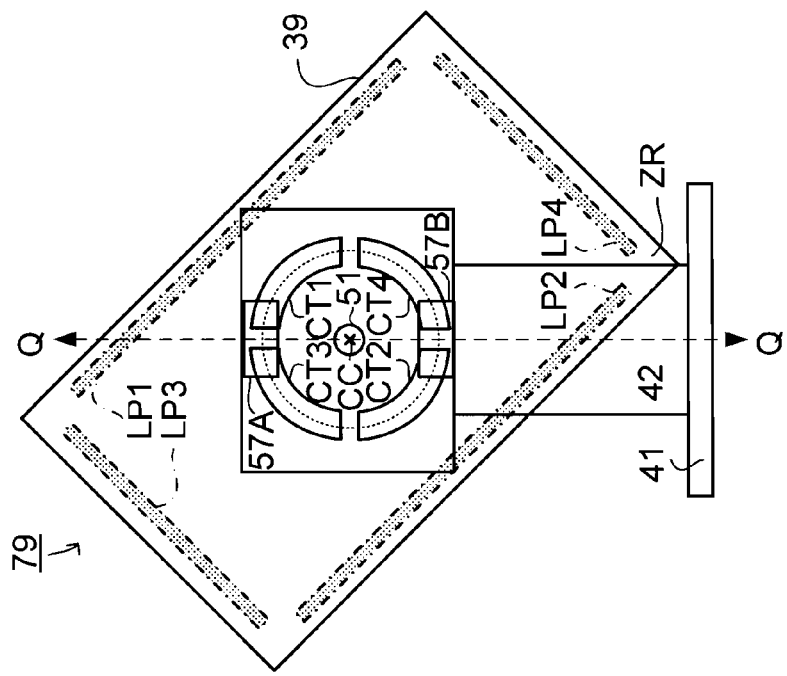
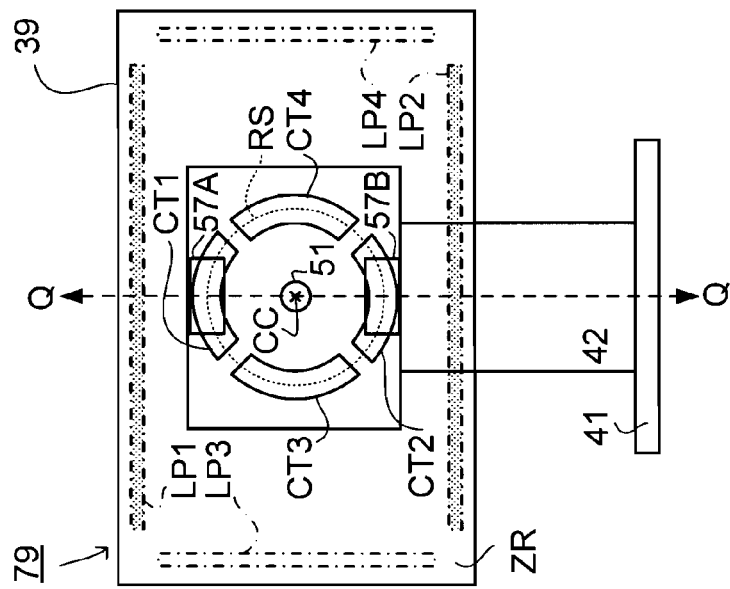

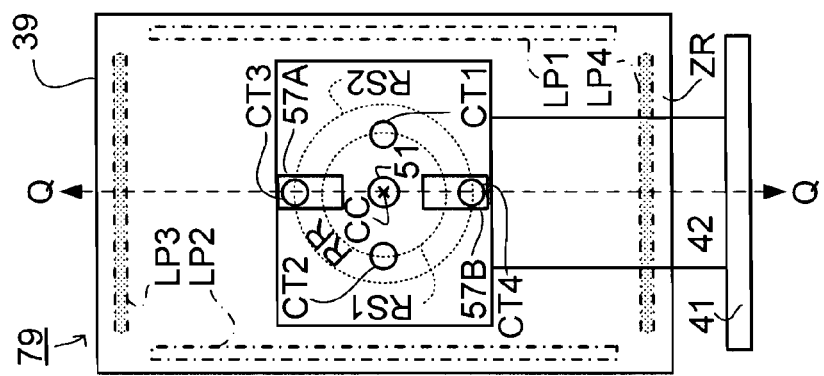
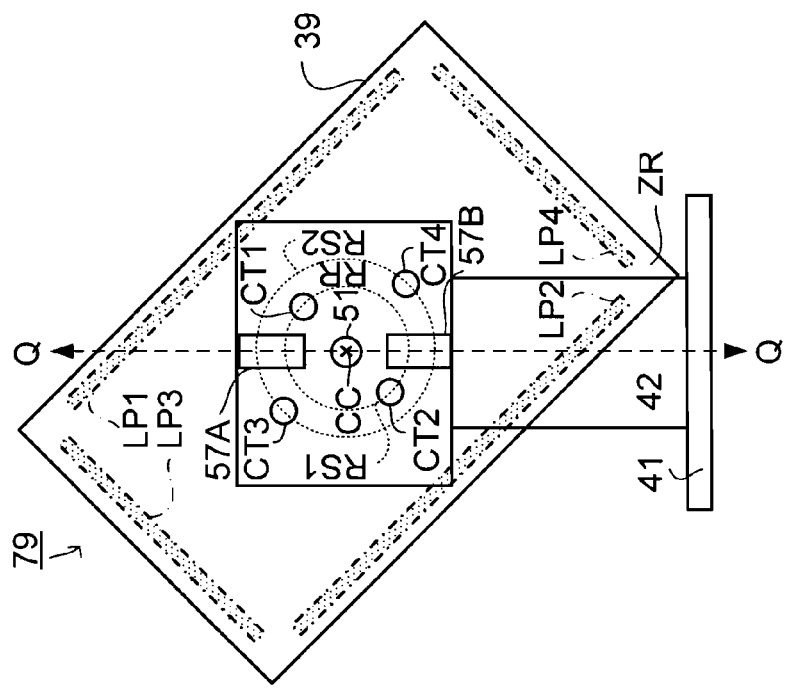
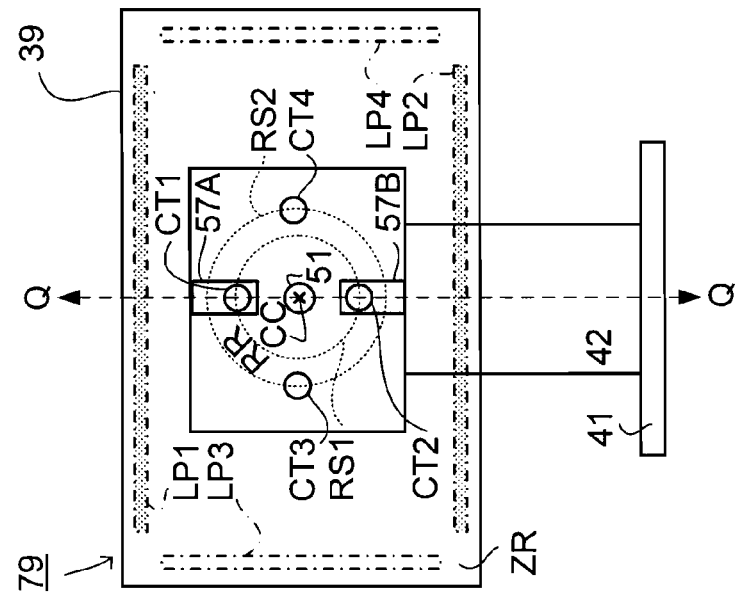

LIGHT EMITTING DEVICE AND LIQUID CRYSTAL DISPLAY DEVICE

TECHNICAL FIELD

The present invention relates to a light emitting device that includes a backlight unit and a hold pedestal for holding rotatably the backlight unit, and to a liquid crystal display device that incorporates the light emitting device.

BACKGROUND ART

In recent years, a liquid crystal display device in which the height and width of a display screen are interchangeable is developed. In a case where in such a liquid crystal display device, a backlight unit that uses a fluorescent lamp as a light source is incorporated, the display screen is changed in the height and width, so that disadvantages arise as described below.

Usually, a fluorescent lamp (e.g., cold-cathode tube) has electrodes (filaments) on both ends of a tube; rare gases such as mercury, argon and the like are confined in the inside of the tube; moreover, a fluorescent-body film is disposed on an inner surface of the tube. And, such a fluorescent lamp makes electrons emitted via the electrode collide with mercury atoms present in the discharge tube. And, ultraviolet rays generated by the collision excite the fluorescent body coated on the inner surface of the tube to generate and emit visible light to outside of the tube.

And, to emit such light, mercury must exist between both electrodes in the fluorescent lamp. However, in a case where the fluorescent lamp is situated along a gravity direction, mercury collects on one electrode, while no mercury exists on the other electrode. Because of this, if both electrodes are discharged in the fluorescent lamp in such a state, electrons do not collide with mercury atoms, so that mercury (ineffective mercury) that is not vaporized remains in the fluorescent lamp. If the ineffective mercury exists in the fluorescent lamp during light emission, the brightness of the fluorescent lamp becomes low and the electrodes deteriorate.

Accordingly, to prevent such disadvantages, in a liquid crystal display device in a patent document 1, a U-shape fluorescent lamp is incorporated. And, even if the display screen is changed in the height and width, the liquid crystal display device does not orient a tip end of the U-shape fluorescent lamp downward in a gravity direction. Because of this, the mercury does not collect on one electrode that is situated at the tip end (U-shape tip end) of the fluorescent lamp to surely exist between both electrodes. As a result of this, the ineffective mercury does not appear in the fluorescent lamp during light emission, so that the disadvantages due to the ineffective mercury are eliminated.

PRIOR ART DOCUMENT

Patent Document

Patent document 1: JP-A-2006-153954

SUMMARY OF THE INVENTION

Problems to be Solved by the Invention

However, in this liquid crystal display device, the U-shape type fluorescent lamp that is special and relatively expensive is used. Because of this, the cost of the liquid crystal display device is likely to increase. Besides, in the interest of size of the liquid crystal display device, there is also a case where it is difficult to employ a fluorescent lamp such as the U-shape type and the like that are relatively large.

The present invention has been made in light of the above situation. And, it is an object of the present invention to provide a light emitting device (device that includes: a backlight unit; and a hold pedestal that holds rotatably the backlight unit) which curbs occurrence of ineffective mercury in a fluorescent lamp during light emission without using a special-shape fluorescent lamp; and a liquid crystal display device which incorporates the light emitting device.

Means for Solving the Problem

The light emitting device includes: a backlight unit that supplies light; and a hold pedestal that holds rotatably the backlight unit. And, in this light emitting device, a plurality of linear light sources in the backlight unit include a first linear light source and a second light source that are so situated as to intersect each other. Moreover, an angle measurement type light-emission control portion, which detects a rotation angle of the backlight unit to the hold pedestal; and in accordance with the rotation angle, controls light emission of the linear light source, is included.

The angle measurement type light-emission control portion, on measuring a first angle range which is a rotation angle in a predetermined range corresponding to the hold pedestal, makes the first linear light source emit light; on the other hand, on measuring a second angle range which is a rotation angle in a predetermined range corresponding to the hold pedestal, makes the second linear light source emit light.

Here, it is desirable that when a surface of the backlight unit that faces the hold pedestal is a rotation surface; and a surface of the hold pedestal that faces the rotation surface is a hold surface, the angle measurement type light-emission control portion is as follows. Specifically, it is desirable that the angle measurement type light-emission control portion includes a first detection portion and a second detection portion which have a relationship in which one detects the other; disposes the first detection portion on the rotation surface and disposes the second detection portion on the hold surface; and detects the rotation angle by detecting the other detection portion by means of the one detection portion.

Besides, it is desirable that the first detection portion includes: a first input terminal which is an input terminal for an electric current that is supplied to the first linear light source; and a second input terminal which is an input terminal for an electric current that is supplied to the second liner light source; and it is desirable that the second detection portion is a supply terminal for flowing an electric current into the input terminal.

Besides, it is desirable that when a locus of the input terminal that appears in a case where the backlight unit rotates with respect to the hold pedestal is a rotation locus, the supply terminal overlaps the rotation locus on the hold surface.

Here, it is desirable that when a rotation center of the backlight unit that rotates is a rotation center point, a shortest distance from the first input terminal to the rotation center point and a shortest distance from the second input terminal to the rotation center point match each other, so that a rotation locus of the first input terminal and a rotation locus of the second input terminal overlie each other. In addition, it is desirable that the supply terminal is so situated as to overlap the overlying rotation loci on the hold surface.

Besides, it is desirable that the supply terminal has a length corresponding to a predetermined length of a circumference of the overlying rotation loci; and the predetermined length is a length that covers at a time an end of the first input terminal and an end of the second input terminal which neighbor to each other on the circumference of the rotation loci.

Besides, it is desirable the first input terminal and the second input terminal have a length corresponding to a predetermined length of a circumference of the overlying rotation loci; and away from each other on the circumference; and it is desirable that the supply terminal has a length that covers at a time an end of the first input terminal and an end of the second input terminal which neighbor to each other on the circumference of the rotation loci.

Here, it is desirable that when a rotation center of the backlight unit that rotates is a rotation center point, a shortest distance from the first input terminal to the rotation center point and a shortest distance from the second input terminal to the rotation center point are different from each other, so that a rotation locus of the first input terminal and a rotation locus of the second input terminal are different from each other. In addition, it is desirable that the supply terminal has a length longer than a line width of a dual rotation locus formed between the different rotation loci; and is so situated as to overlap the dual rotation locus on the hold surface.

Besides, it is desirable that the supply terminal has a length corresponding to a predetermined length of a circumference of the dual rotation locus; and the predetermined length is a length that covers at a time an end of the first input terminal and an end of the second input terminal which neighbor to each other on the circumference of the dual rotation locus.

Besides, it is desirable that the first input terminal has a length corresponding to a predetermined length of a circumference of the rotation locus of itself; the second input terminal has a length corresponding to a predetermined length of a circumference of the rotation locus of itself; and it is desirable that the supply terminal has a length that covers at a time an end of the first input terminal and an end of the second input terminal which neighbor to each other on the circumference of the dual rotation locus.

In the meantime, there are various types of angle measurement type light-emission control portions. For example, an angle measurement type light-emission control portion may include: an angle measurement unit that detects a rotation angle of the backlight unit to the hold pedestal; and a light-emission control unit that controls light emission of the linear light source in accordance with the rotation angle. And, it is desirable that in such an angle measurement type light-emission control portion, the light-emission control unit makes the first linear light source emit light when the rotation angle measured by the angle control unit falls in the first angle range; on the other hand, makes the second linear light source emit light when the rotation angle measured by the angle control unit falls in the second angle range.

Here, it is possible to say that a liquid crystal display device, which includes: the above light emitting device; and a liquid crystal display panel that receives light from the backlight unit of the light emitting device, is also the present invention.

Advantages of the Invention

According to the light emitting device of the present invention, for example, in accordance with the setting of the first angle range to make the first linear light source emit light, the first linear light source is made to emit light only when the first linear light source intersects (e.g., meets at right angles) the gravity direction. Likewise, in accordance with the setting of the second angle range to make the second linear light source emit light, the second linear light source is made to emit light only when the second linear light source intersects (e.g., meets at right angles) the gravity direction. Because of this, during light emission of the linear light source, the mercury in the inside of the linear light source does not collect on either one end of both ends of the linear light source. Because of this, mercury exists between both electrodes of the linear light source, while ineffective mercury due to a mercury shortage does not appear on one electrode. Because of this, a disadvantage due to ineffective mercury is curbed.

BRIEF DESCRIPTION OF THE DRAWINGS

FIG. 10A is a plan view showing the plan view of FIG. 9A and the plan view of FIG. 9B that are laid on each other, that is, a plan view showing a state in which a liquid crystal display unit in a width disposition is mounted on a hold pedestal.

FIG. 10B is a plan view showing the plan view of FIG. 9A and the plan view of FIG. 9B that are laid on each other, that is, a plan view showing a state in which a liquid crystal display unit in an oblique disposition is mounted on a hold pedestal.

FIG. 10C is a plan view showing the plan view of FIG. 9A and the plan view of FIG. 9B that are laid on each other, that is, a plan view showing a state in which a liquid crystal display unit in a height disposition is mounted on a hold pedestal.

FIG. 12A is a plan view showing the plan view of FIG. 11A and the plan view of FIG. 11B that are laid on each other, that is, a plan view showing a state in which a liquid crystal display unit in a width disposition is mounted on a hold pedestal.

FIG. 12B is a plan view showing the plan view of FIG. 11A and the plan view of FIG. 11B that are laid on each other, that is, a plan view showing a state in which a liquid crystal display unit in an oblique disposition is mounted on a hold pedestal.

FIG. 12C is a plan view showing the plan view of FIG. 11A and the plan view of FIG. 11B that are laid on each other, that is, a plan view showing a state in which a liquid crystal display unit in a height disposition is mounted on a hold pedestal.

EMBODIMENTS FOR CARRYING OUT THE INVENTION

Embodiment 1

An embodiment is described based on drawings as follows. Here, for convenience, there is a case where hatchings, member reference numbers and the like are omitted; in such a case, other drawings are referred to. On the other hand, there is a case where even a plan view is represented by hatching.

Figure 1:
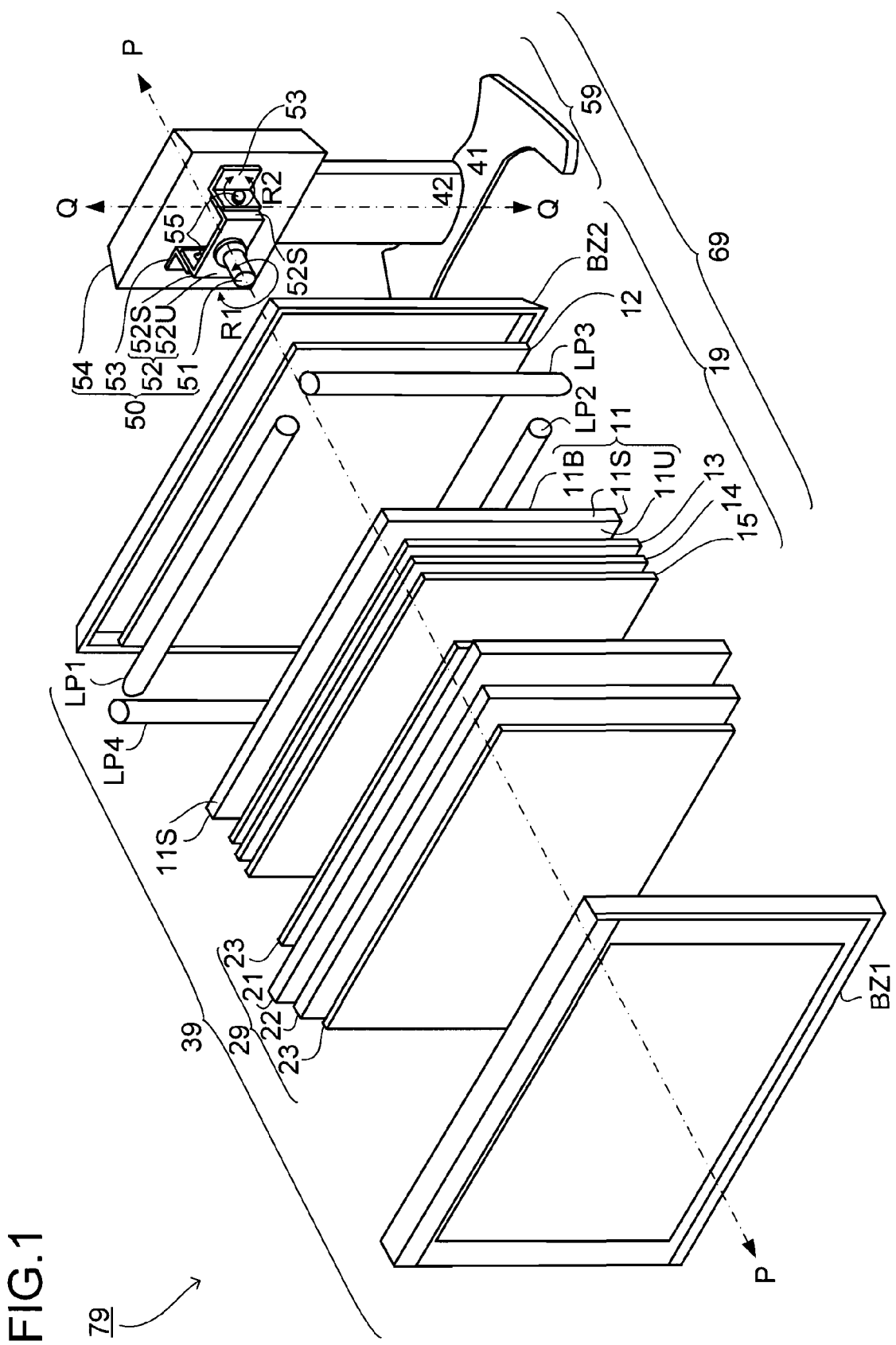
FIG. 1 is an exploded perspective view of a liquid crystal display device.
Figure 2:
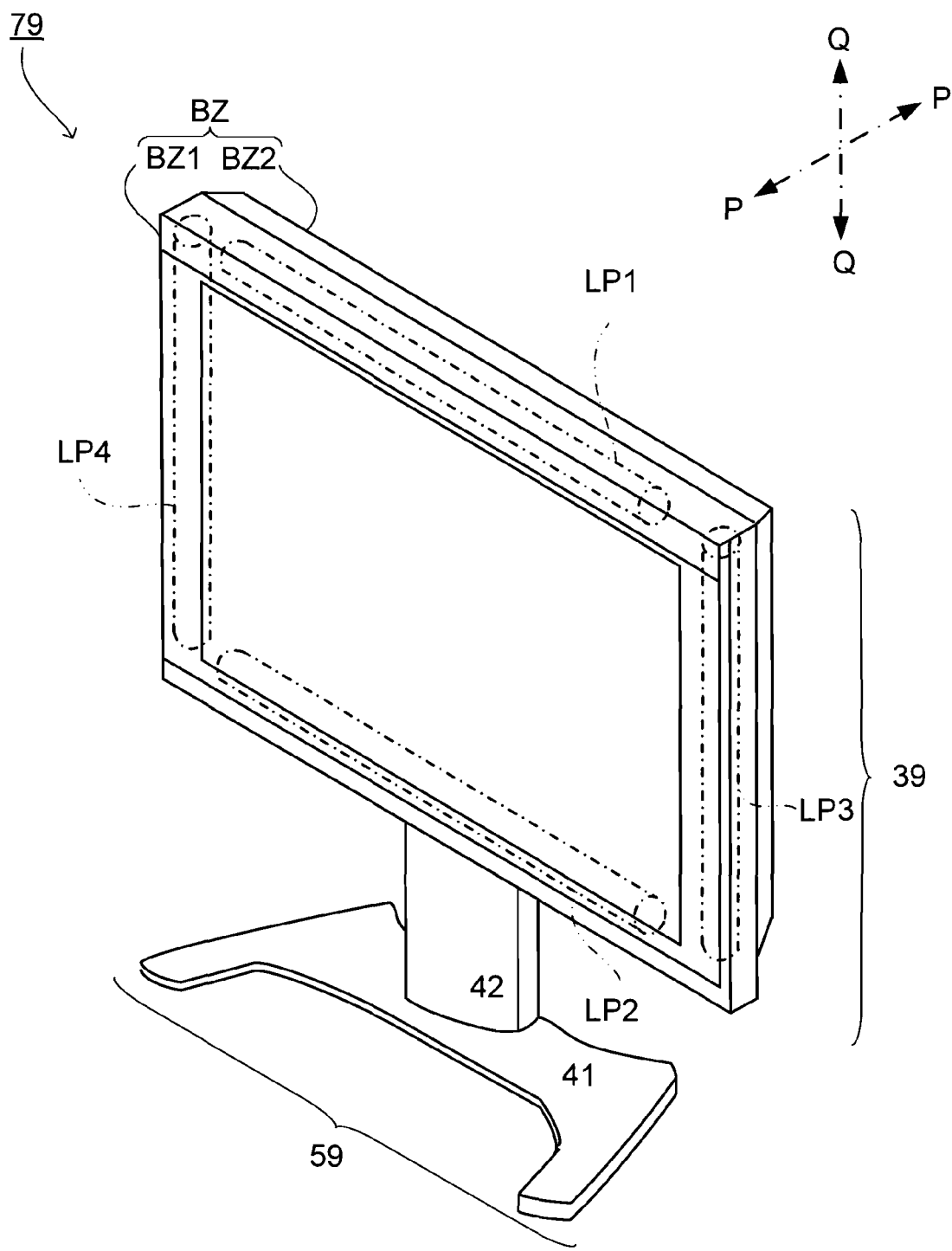
FIG. 2 is a perspective view of a liquid crystal display device.

FIG. 1 is an exploded perspective view of a liquid crystal display device 79 that includes a liquid crystal display unit 39 and a hold pedestal 59; FIG. 2 is a perspective view of the liquid crystal display device 79 that supports the liquid crystal display unit 39 by means of the hold pedestal 59.

The liquid crystal display unit 39, as shown in FIG. 1, includes: a liquid crystal display panel 29; a backlight unit 19; a bezel BZ (front bezel BZ1, rear bezel BZ2) that sandwiches these (liquid crystal display panel 29, backlight unit 19) to hold them.

Here, the shape of the bezel BZ is not especially limited. For example, the rear bezel BZ2 may be a box body that houses the liquid crystal display panel 29 and the backlight unit 19; and the front bezel BZ1 may be a frame body that covers the rear bezel BZ1. Besides, because the rear bezel BZ2 houses the backlight unit 19, it is possible to say that the rear bezel BZ2 is a component of the backlight unit 19 (in other words, it may be construed that the backlight unit 19 includes the rear bezel BZ2).

The liquid crystal display panel 29 attaches an active matrix board 21 that includes switching elements such as a TFT (Thin Film Transistor) and the like and an opposite board 22 that faces the active matrix board 21 to each other by means of a seal material (not shown). And, liquid crystal (not shown) is injected into a gap between both boards 21, 22

(here, polarization films 23, 23 are so mounted as to sandwich the active matrix board 21 and the opposite board 22).

The backlight unit 19 shines light onto a non-light emitting type liquid crystal display panel 29. In other words, the liquid crystal display panel 29 receives the light (backlight) from the backlight unit 19 to perform a display function. Because of this, if the light from the backlight unit 19 is able to evenly shine on the entire surface of the liquid crystal display panel 29, the display quality of the liquid crystal display panel 29 improves.

And, the backlight unit 19, as shown in FIG. 1, includes: a fluorescent lamp LP (LP1 to LP4); a light guide plate 11; a reflection sheet 12; a diffusion sheet 13; and optical sheets 14, 15.

The fluorescent lamp (linear light source) LP has a linear shape (bar shape, cylindrical shape and the like) and is so disposed in the backlight unit 19 as to have a loop shape, for example, a quadrangular shape (for example, so disposed as to face all side surfaces 11S of the light guide plate 11). However, in FIG. 1, although the number of fluorescent lamps LP for every edge of the quadrangular shape is one, this is not limiting. In other words, a plurality of fluorescent lamps LP may be arranged for every edge of the quadrangular shape. Besides, the kind of the fluorescent lamp LP is not limited and for example, may be a cold-cathode tube or a hot-cathode tube.

The light guide plate 11 is a plate-shape member that includes: the side surface 11S; a top surface 11U and a bottom surface 11B which are so situated as to sandwich the side surface 11S. And, the side surface 11S (light receiving surface) faces the fluorescent lamp LP to receive the light from the fluorescent lamp LP. The received light undergoes mixing in the inside of the light guide plate 11 and is output as area light from the top surface 11U to outside.

The reflection sheet 12 is so situated as to be covered by the light guide plate 11. And, a surface of the reflection sheet 12 that faces the bottom surface 11B of the light guide plate 11 serves as a reflection surface. Because of this, this reflection surface reflects, without leaking, the light from the fluorescent lamp LP and the light propagating in the inside of the light guide plate 11 back into the light guide plate 11 (in detail, via the bottom surface 11B of the light guide plate 11).

The diffusion sheet 13 is so situated as to cover the top surface 11U of the light guide plate 11; and diffuses the area light from the light guide plate 11 to spread the light into the entire liquid crystal display panel 29 (here, the diffusion sheet 13 and the optical sheets 14, 15 are also collectively called an optical sheet group).

The optical sheets 14, 15 have a prism shape in a sheet surface, for example; are optical sheets that deflect a radiation characteristic of light; and so situated as to cover the diffusion sheet 13. Because of this, the optical sheets 14, 15 collect the light that comes out of the diffusion sheet 13 to improve the brightness (here, divergence directions of each light collected by the optical sheet 14 and the optical sheet 15 are in a relationship to intersect each other).

Here, the above reflection sheet 12, the light guide plate 11, the diffusion sheet 13, the optical sheets 14, 15 are piled up in this order. Accordingly, the piled-up direction is called a pile-up direction P.

And, in the above backlight unit 19, the light from the fluorescent lamp LP is formed into the area light by the light guide plate 11 and output; the area light passes through the optical sheet group to be output as the backlight whose brightness is improved. And, the backlight reaches the liquid crystal display panel 29; and by means of the backlight, the liquid crystal display panel 29 displays an image.

The hold pedestal 59 is a pedestal (stand) for holding the liquid crystal display unit 39 and includes: a base 41; a support strut 42; and a rotary unit 50.

The base 41 is a stand that comes into direct contact with a place where the liquid crystal display device 79 is installed. Accordingly, when the base 41 is disposed on a horizontal surface, a surface direction of the base 41 is the same direction as a horizontal direction.

The support strut 42 is a strut member that stands up from the base 41. The rotary unit 50 connects with a tip-end side of the support strut 42 and also connects with the liquid crystal display unit 39.

In detail, the rotary unit 50 connects with the liquid crystal display unit 39, thereby supporting rotatably the liquid crystal display unit 39. Specifically, the rotary unit 50 includes: a support shaft 51; a support-shaft base 52; a backing base 53; and a main base 54.

The support shaft 51 is a cylinder-shape shaft member and connects with the rear bezel BZ2 of the liquid crystal display unit 39, thereby connecting the rotary unit 50 (and the hold pedestal 59) and the liquid crystal display unit 39 to each other. Here, the rear bezel BZ2 is connected to a forward tip end of the support shaft 51, while a groove is formed on and along a shaft circumference at a backward tip end of the of the support shaft 51. And, a member that has an opening rim which fits into the groove is the support-shaft base 52.

In other words, the support-shaft base 52 is a base that supports rotatably the support shaft 51. In detail, the support-shaft base 52 includes: a main surface portion 52U that is a plate-shape member; and side surface portions 52S that are plate-shape members which stand up from opposite ends of the main surface portion 52U.

And, the main surface portion 52U has a circular opening and a rim of the opening fits into the groove formed on the support shaft 51. In other words, the rim of the circular opening and the groove on the shaft circumference of the cylinder-shape support shaft 51 fit into each other. As a result of this, the support shaft 51 is rotatably (see an arrow R1) supported by the main surface portion 52U.

The side surface portions 52S are so situated as to stand up from the opposite ends of the main surface portion 52U and have an opening. And, the side surface portion 52S (and the support-shaft base 52) is mounted on the backing base 53 via a support screw 55 that fits in the opening.

The backing base 53 includes two pieces of members that correspond to the two side surface portions 52S. Each backing base 53 connects two surface members to each other into an L shape; one surface member includes an opening into which the support screw 55 fits. Because of this, the side surface portion 52S and the backing base 53 connect with each other via the support screw 55. Especially, on the support screw 55 as a pivot, the side surface portion 52S (and the support-shaft base 52) rotates with respect to the backing base 53 (see an arrow R2).

The main base 54 is a member on which the other surface member (without an opening) of the backing base 53 is mounted; and situated on a tip end side of the support strut 42. In detail, the main base 54 is mounted on the tip end side of the support strut 42; on a surface of the main base 54, the backing base 53 is fixed with the surface direction of the surface member having its opening held parallel to an extending direction (strut direction) Q of the support strut 42 and to the pile-up direction P.

Accordingly, the rotary unit 50 allows the support shaft 51 to incline with respect to the extending direction Q of the support strut 42; and allows the support shaft 51 to rotate (clockwise rotatable and counterclockwise rotatable) about the shaft. Because of this, as shown in the plan view of FIG. 3 and the plan view of FIG. 4, the liquid crystal display unit 39 becomes rotatable 360° about the support shaft 51 (the rotation angle in the following description means how much the liquid crystal display unit 39 (in detail, the backlight unit 19) that rotates about the support shaft 51 rotates with respect to the hold pedestal 59).

Figure 3:
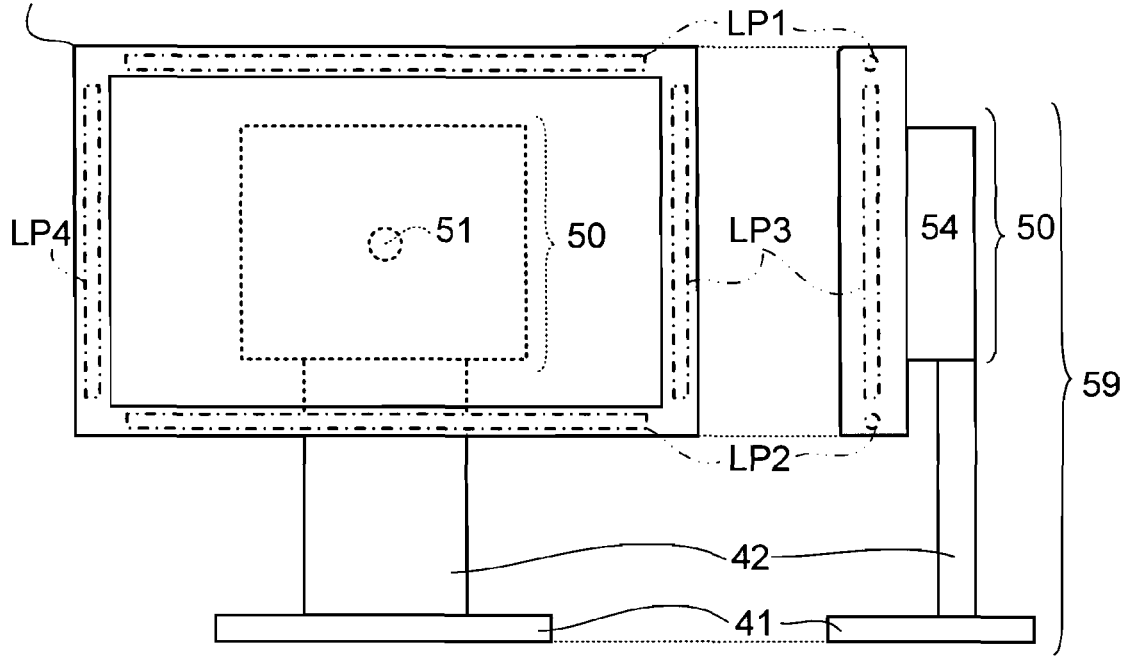
FIG. 3 is a plan view of a liquid crystal display device in which a liquid crystal display unit is laid down, that is, put in a width disposition.
Figure 4:
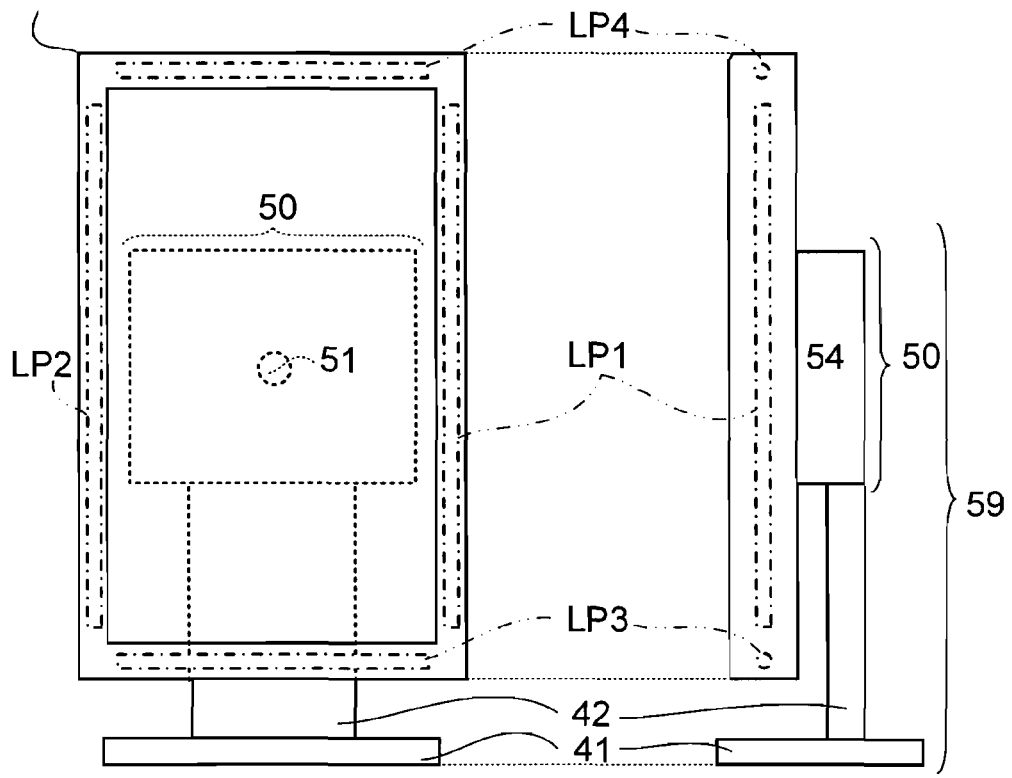
FIG. 4 is a plan view of a liquid crystal display device in which a liquid crystal display unit is disposed upright, that is, put in a height disposition.

Here, a disposition in which the long edge of the liquid crystal display unit 39 shown in FIG. 3 extends in a horizontal direction is called a width disposition; and a disposition in which the short edge of the liquid crystal display unit 39 shown in FIG. 4 extends in a horizontal direction is called a height disposition (here, FIG. 3 and FIG. 4 do not show the entire rotary unit 50 but show chiefly the main base 54 and the support shaft 51).

Here, a light emitting state of the fluorescent lamp LP (LP1 to LP4) in accordance with the position of the liquid crystal display unit 39 (in detail, the backlight unit 19) is described by means of FIG. 5A to FIG. 5D. Here, in a case where a reticulate-point hatching is applied to the fluorescent lamp LP, it is meant that the fluorescent lamp LP is emitting light.

Figure 5A:
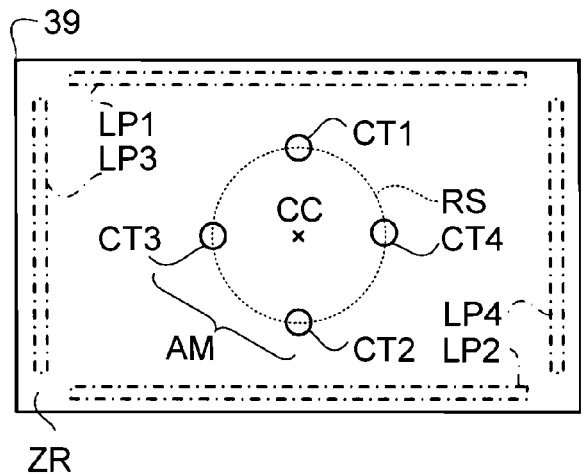
FIG. 5A is a plan view of a rear surface of a liquid crystal display unit.
Figure 5B:
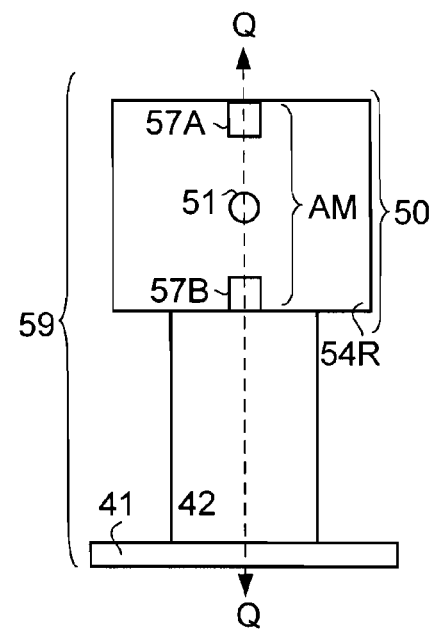
FIG. 5B is a plan view of a front surface of a hold pedestal.

FIG. 5A is a plan view of the rear surface of the liquid crystal display unit 39; in other words, a plan view in which a rear surface (rotation surface) of the rear bezel BZ2 is a front surface, while FIG. 5B is a plan view of a front surface of the hold pedestal 59; in other words, a plan view in which a mount surface (hold surface) of the main base 54 that supports the support shaft 51 is a front surface (here, the rear surface ZR of the rear bezel BZ2 and the mount surface 54R of the main base 54 face each other over a relatively short distance). Here, FIG. 5B does not show the entire rotary unit 50 but shows chiefly the main base 54, the support shaft 51 and a supply terminal 57 described later.

Figure 5C:
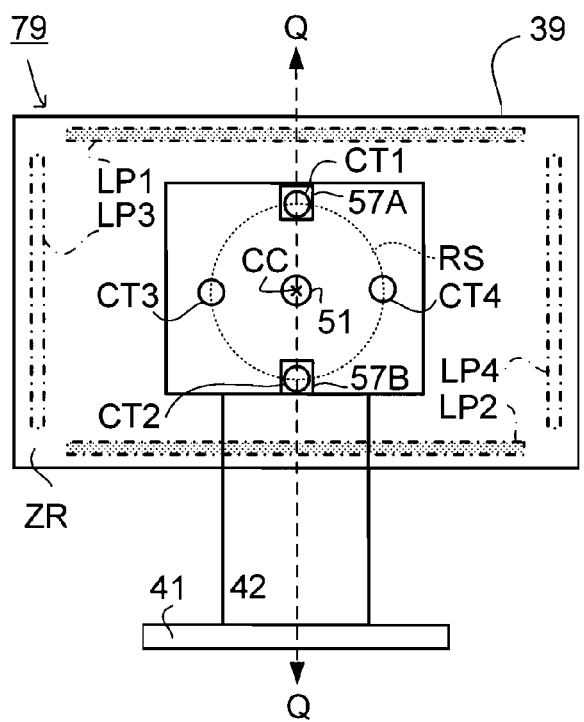
FIG. 5C is a plan view showing a state in which a liquid crystal display unit in a width disposition is mounted on a hold pedestal with the plan view of FIG. 5A and the plan view of FIG. 5B laid on each other.
Figure 5D:
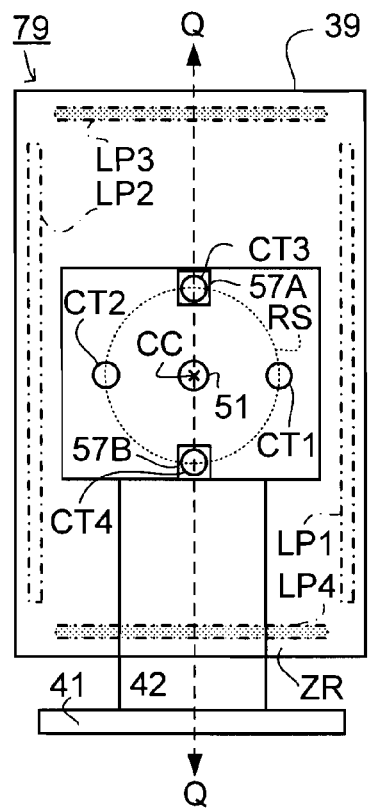
FIG. 5D is a plan view showing a state in which a liquid crystal display unit in a height disposition is mounted on a hold pedestal with the plan view of FIG. 5A and the plan view of FIG. 5B laid on each other.

FIG. 5C and FIG. 5D are plan views showing a state in which the liquid crystal display unit 39 is mounted on the hold pedestal 59 with the plan view of FIG. 5A and the plan view of FIG. 5B laid on each other (here, FIG. 5C shows the liquid crystal display unit 39 in a width disposition; and FIG. 5D shows the liquid crystal display unit 39 in a height disposition).

As shown in FIG. 5A, an input terminal (first detection portion) CT, which serves as an entrance for an electric current which flows into the fluorescent lamp LP, is included in the liquid crystal display unit 39. This input terminal CT (CT1 to CT4) corresponds to the fluorescent lamp LP (LP1 to LP4). Because of this, in a case where there are four fluorescent lamps LP (LP1 to LP4) as shown in FIG. 5A, there are also four input terminals CT (CT1 to CT4).

In addition, these four input terminals CT1 to CT4 are circularly situated around a mount point (rotation center point) CC of the support shaft 51 on the rear surface ZR of the rear bezel BZ2 and away from each other at equal intervals on the circle RS.

In detail, the input terminal CT1 corresponding to the fluorescent lamp LP1 that extends along the long edge of the liquid crystal display unit 39 and the input terminal CT2 corresponding to the fluorescent lamp LP2 that is parallel to the fluorescent lamp LP1 are so arranged as to intersect (e.g., meet at right angles) extending directions of the fluorescent lamps LP1, LP2. Besides, the input terminal CT3 corresponding to the fluorescent lamp LP3 that extends along the short edge of the liquid crystal display unit 39 and the input terminal CT4 corresponding to the fluorescent lamp LP4 that is parallel to the fluorescent lamp LP3 are so arranged as to intersect (e.g., meet at right angles) extending directions of the fluorescent lamps LP3, LP4.

On the other hand, a supply terminal (second detection portion) 57, which comes into contact with the input terminal CT to supply an electric current from a not-shown inverter to the fluorescent lamp LP, is included in the hold pedestal 59. The supply terminals 57 (57A, 57B) are arranged in a line with the support shaft 51 centered. In detail, the supply terminals 57 are away from each other by about the same distance (i.e., the length of the diameter of the circle RS) between the input terminal CT1 and the input terminal CT2 and arranged along the extending direction Q of the support strut 42.

According to this, as shown in FIG. 5C, when the liquid crystal display unit 39 is mounted onto the hold pedestal 59 to be put into the width disposition, the input terminal CT1 comes into contact with the supply terminal 57A, while the input terminal CT2 comes into contact with the supply terminal 57B. Because of this, the fluorescent lamp LP1 and the fluorescent lamp LP2 (first linear light sources LP1, LP2) that are parallel to the base 41 of the hold pedestal 59 emit light. In other words, when the base 41 is placed horizontally, only the fluorescent lamps LP1, LP2 that are so disposed as to intersect (e.g., meet at right angles) the gravity direction emit light.

On the other hand, as shown in FIG. 5D, when the liquid crystal display unit 39 is mounted onto the hold pedestal 59 to be put into the height disposition, the input terminal CT3 comes into contact with the supply terminal 57A, while the input terminal CT4 comes into contact with the supply terminal 57B. Because of this, the fluorescent lamp LP3 and the fluorescent lamp LP4 (second linear light sources LP3, LP4) that are parallel to the base 41 of the hold pedestal 59 emit light. In other words, when the base 41 is placed horizontally, only the fluorescent lamps LP3, LP4 that are so disposed as to intersect (e.g., meet at right angles) the gravity direction emit light.

In other words, the fluorescent lamp LP1 and the fluorescent lamp LP2 emit light in a case where the fluorescent lamp LP1 and the fluorescent lamp LP2 are situated at a rotation angle in a predetermined range (first angle range) to the hold pedestal 59. For example, considering the position of the hold pedestal 59 with the extending direction Q of the support strut 42 used as a reference, in a case where the fluorescent lamp LP1 and the fluorescent lamp LP2 are so situated in an angle range (a predetermined angle range including 90°) as to meet the extending direction Q at nearly right angles, the fluorescent lamps LP1, LP2 emit light. In short, when the liquid crystal display unit 39 is put in the width disposition and the fluorescent lamps LP1, LP1 are placed horizontally, the fluorescent lamps LP1, LP1 emit light.

Besides, the fluorescent lamp LP3 and the fluorescent lamp LP4 also emit light in a case where the fluorescent lamp LP3 and the fluorescent lamp LP4 are situated at a rotation angle in a predetermined range (second angle range) to the hold pedestal 59. For example, in a case where the fluorescent lamp LP3 and the fluorescent lamp LP4 are so situated in an angle range (a predetermined angle range including 90°) as to meet the extending direction Q at nearly right angles, the fluorescent lamps LP3, LP4 emit light. In short, when the liquid crystal display unit 39 is put in the height disposition and the fluorescent lamps LP3, LP4 are placed horizontally, the fluorescent lamps LP3, LP4 emit light.

According to this, only the fluorescent lamp LP that intersects (e.g., meet at right angles) the gravity direction emits light. Because of this, during the light emission of the fluorescent lamp LP, the mercury in the inside of the fluorescent lamp LP does not collect on either end of both ends of the fluorescent lamp LP. Because of this, on one of electrodes (not shown) situated at both ends of the fluorescent lamp LP, a mercury shortage does not occur.

In other words, mercury exists between the fluorescent lamp LP during the light emission and electrons collide with the mercury, so that vaporized mercury spreads in the inside of the fluorescent lamp LP (occurrence of ineffective mercury is curbed). As a result of this, the entire fluorescent lamp LP emits even light. In other words, a situation, in which the brightness becomes low at one end side of the fluorescent lamp LP because of a mercury shortage, is prevented. Besides, a situation, in which mercury runs short near the electrodes of the fluorescent lamp LP; and because of this, the electrodes deteriorate, is also prevented.

Here, the rotation angle of the fluorescent lamp LP to the hold pedestal 59 is measured by means of contact between the input terminal CT formed on the rear surface ZR of the rear bezel BZ2 and the supply terminal 57 formed on the mount surface 54R of the main base 54 of the hold pedestal 59. In other words, the input terminal CT detects the supply terminal 57 (or the supply terminal 57 detects the input terminal CT), so that the rotation angle is measured and the light emission of the fluorescent lamp LP is also controlled. Because of this, the input terminal CT and the supply terminal 57 are also able to be called an angle measurement type light-emission control portion AM.

Such angle measurement type light-emission control portion AM uses relatively simple members, that is, the input terminal CT for flowing an electric current into the fluorescent lamp LP and the supply terminal 57 for supplying an electric current to the input terminal CT. Because of this, the angle measurement type light-emission control portion AM allows cost reduction compared with a complicated and special angle measurement type light-emission control portion.

Embodiment 2

An embodiment 2 is described. Here, members that have the same functions as members used in the embodiment 1 are indicated by the same reference numbers and description of them is skipped.

In the embodiment 1, a rotation locus of the input terminal CT (CT1 to CT4), which appears in a case where the liquid crystal display unit 39 rotates with respect to the hold pedestal 59, forms the circle RS. And, in the case where the liquid crystal display unit 39 is mounted on the hold pedestal 59, on the mount surface 54R of the main base 54 of the hold pedestal 59, the supply terminal 57 (57A, 57B) is so situated as to overlap the circle RS, that is, the rotation locus (here, this overlap is an overlap in a case where the rear surface ZR of the rear bezel BZ2 (or the mount surface 54R) is a front surface).

In detail, the shortest distance (length of the radius of the circle RS) from the input terminals CT1, CT2 to the mount point CC and the shortest distance from the input terminals CT3, CT4 to the mount point CC match each other, so that the rotation locus of the input terminals CT1, CT2 and the rotation locus of the input terminals CT3, CT4 overlie each other. And, the supply terminals 57A, 57B are so situated as to overlap the rotation loci (in short, the circle RS) that overlie each other.

Figure 6A:
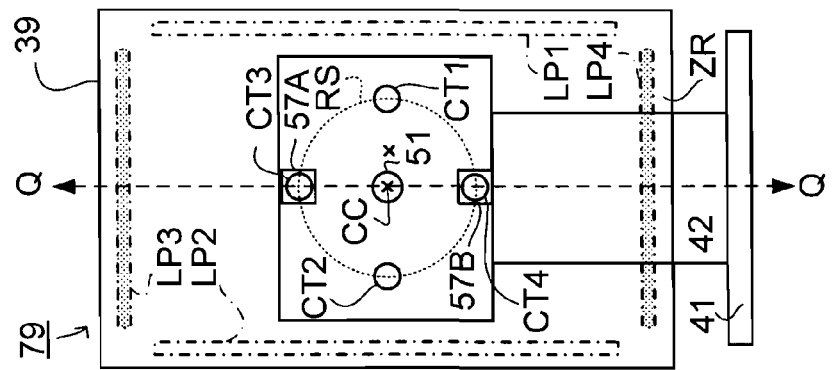
FIG. 6A is a plan view showing the plan view of FIG. 5A and the plan view of FIG. 5B that are laid on each other, that is, a plan view showing a state in which a liquid crystal display unit in a width disposition is mounted on a hold pedestal.
Figure 6B:
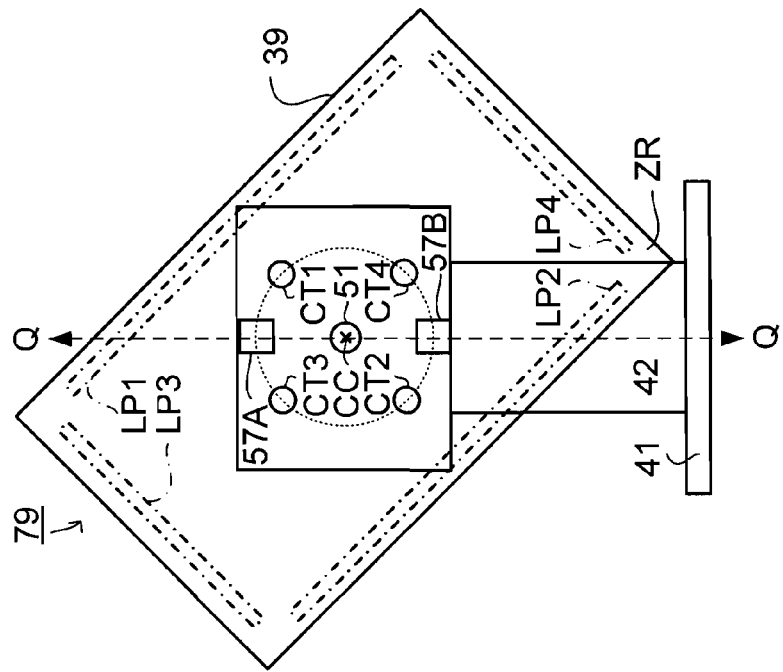
FIG. 6B is a plan view showing the plan view of FIG. 5A and the plan view of FIG. 5B that are laid on each other, that is, a plan view showing a state in which a liquid crystal display unit in an oblique disposition is mounted on a hold pedestal.
Figure 6C:
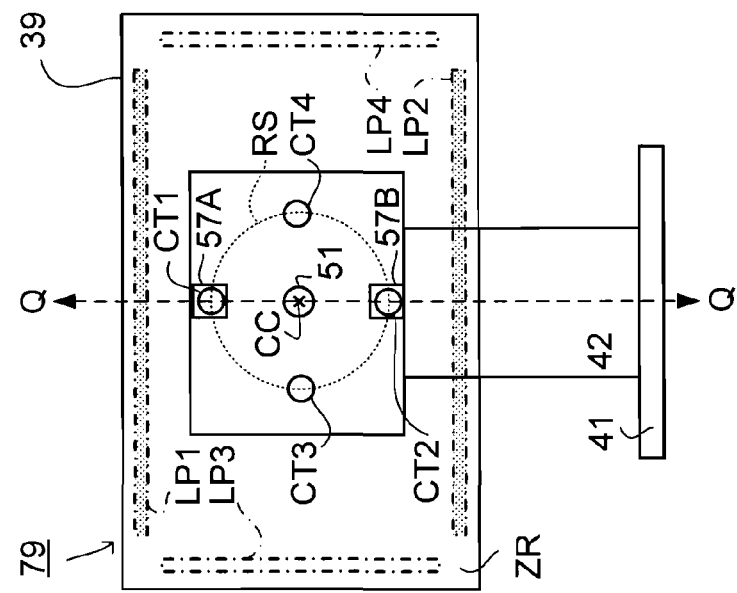
FIG. 6C is a plan view showing the plan view of FIG. 5A and the plan view of FIG. 5B that are laid on each other, that is, a plan view showing a state in which a liquid crystal display unit in a height disposition is mounted on a hold pedestal.

In such liquid crystal display device 79, a process in which the liquid crystal display unit 39 is changed from a width disposition to a height disposition is shown in FIG. 6A to FIG. 6C. FIG. 6A shows the width disposition of the liquid crystal display unit 39; FIG. 6C shows the height disposition of the liquid crystal display unit 39; and FIG. 6B shows the process in the liquid crystal display unit 39 is changed from the width disposition to the height disposition.

As shown in FIG. 6A, in a case where the liquid crystal display unit 39 is in the width disposition, the input terminals CT1, CT2 come into contact with the supply terminals 57A, 57B, so that an electric current flows into the fluorescent lamps LP1, LP2 and the fluorescent lamps LP1, LP2 emit light. Besides, in a case where the liquid crystal display unit 39 is in the height disposition, the input terminals CT3, CT4 come into contact with the supply terminals 57A, 57B, so that an electric current flows into the fluorescent lamps LP3, LP4 and the fluorescent lamps LP3, LP4 emit light.

However, as shown in FIG. 6B, in the process in which the liquid crystal display unit 39 is changed from the width disposition to the height disposition, the input terminals CT1 to CT4 and the supply terminals 57A, 57B do not come into contact with each other, so that the fluorescent lamps LP1 to LP4 do not shine at all. Here, the liquid crystal display device 79 that prevents such a situation is described by means of FIG. 7A to FIG. 7D and FIG. 8A to FIG. 8C. Here, the ways of representing FIG. 7A to FIG. 7D are the same as the ways of FIG. 5A to FIG. 5D; the ways of representing FIG. 8A to FIG. 8C are the same as the ways of FIG. 6A to FIG. 6C.

Figure 7A:
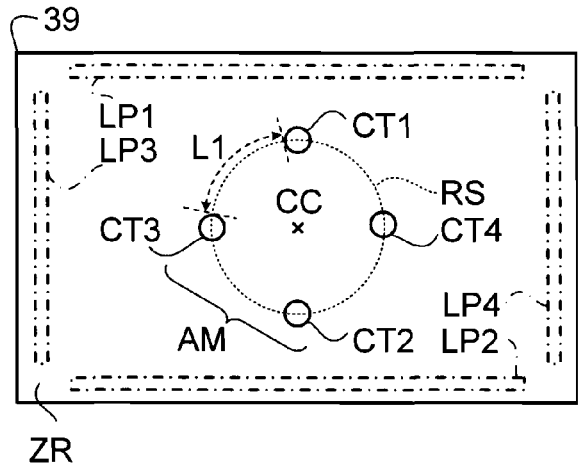
FIG. 7A is the same plan view as that of FIG. 5A.

FIG. 7A is completely the same as FIG. 5A: the input terminals CT1 to CT4 are circularly situated around the mount point CC on the rear surface ZR of the rear bezel BZ2 and away from each other at equal intervals on the circle RS.

Figure 7B:
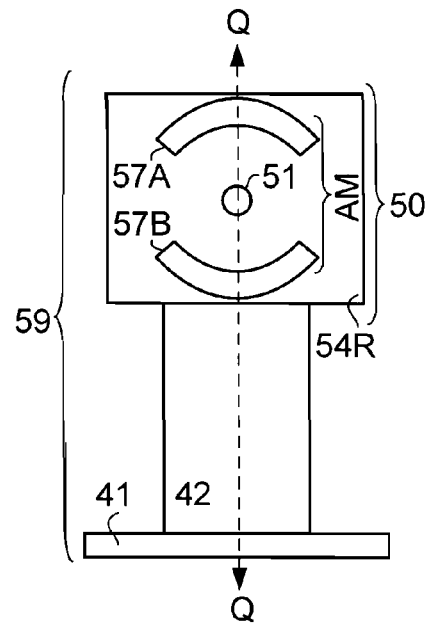
FIG. 7B is a plan view of another example of FIG. 5B.

On the other hand, FIG. 7B is similar to FIG. 5B: the supply terminals 57A, 57B are away from each other by about the same distance (i.e., the length of the diameter of the circle RS) between the input terminal CT1 and the input terminal CT2 and arranged in a line along the extending direction Q of the support strut 42 with the support shaft 51 centered. In addition, the supply terminals 57A, 57B have a length corresponding to a predetermined length of a circumference of the circle RS; and the predetermined length is longer than a distance L1 between the neighboring and different kinds of input terminal CT1 and input terminal CT3 on the circumference of the circle RS (in short, have a length that is able to cover at a time an end of the input terminal CT1 and an end of the input terminal CT3 that are different from each other in the kind and neighbor to each other on the circumference of the circle RS). Because of this, for example, as shown in FIG. 7B, the supply terminal 57 is formed into a curve shape (bent shape).

Figure 7C:
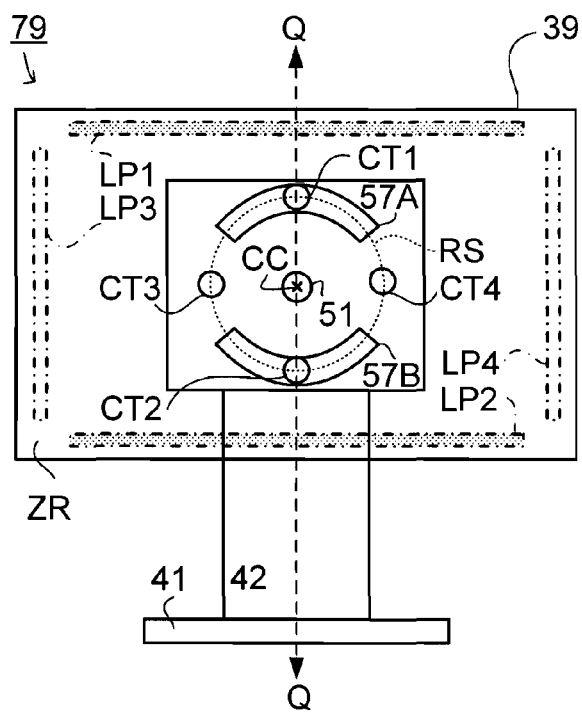
FIG. 7C is a plan view showing a state in which a liquid crystal display unit in a width disposition is mounted on a hold pedestal with the plan view of FIG. 7A and the plan view of FIG. 7B laid on each other.
Figure 8A:
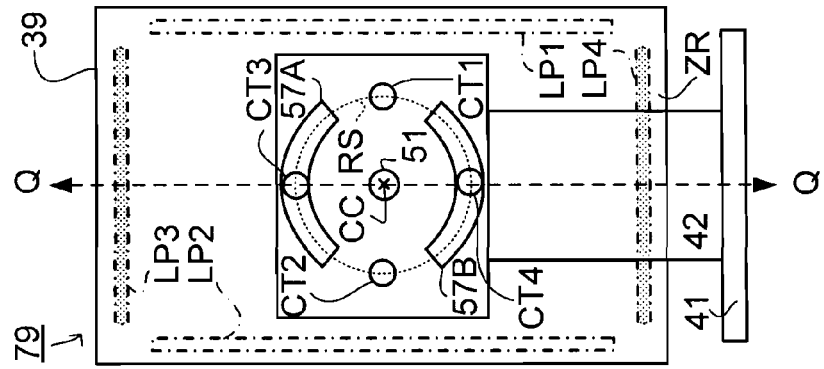
FIG. 8A is a plan view showing the plan view of FIG. 7A and the plan view of FIG. 7B that are laid on each other, that is, a plan view showing a state in which a liquid crystal display unit in a width disposition is mounted on a hold pedestal.
Figure 8B:
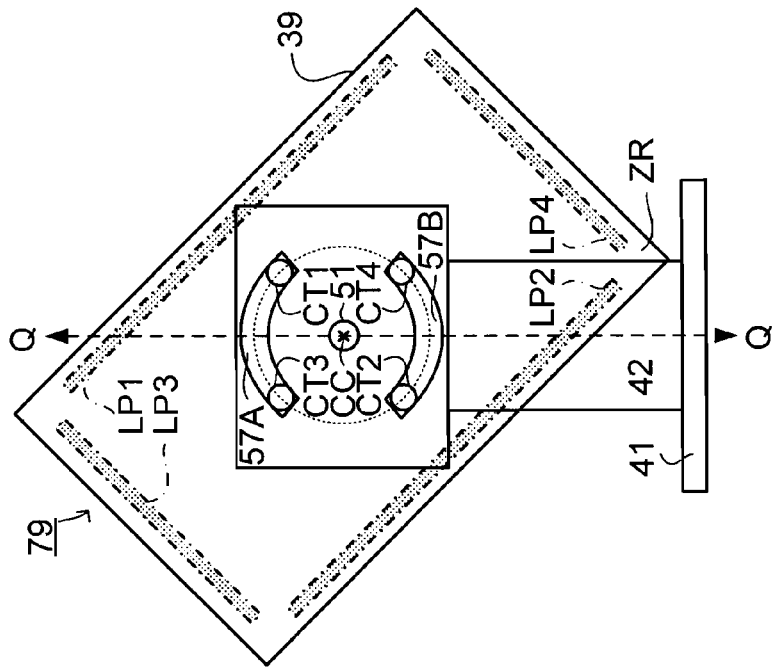
FIG. 8B is a plan view showing the plan view of FIG. 7A and the plan view of FIG. 7B that are laid on each other, that is, a plan view showing a state in which a liquid crystal display unit in an oblique disposition is mounted on a hold pedestal.
Figure 8C:
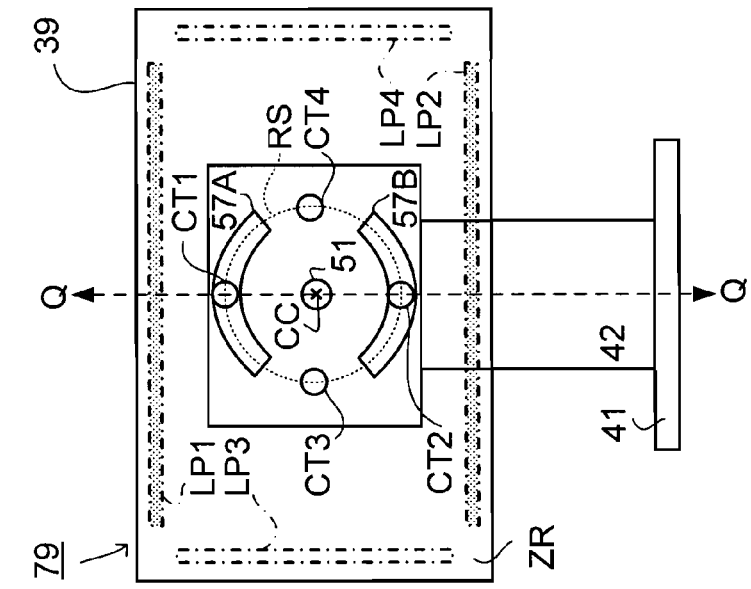
FIG. 8C is a plan view showing the plan view of FIG. 7A and the plan view of FIG. 7B that are laid on each other, that is, a plan view showing a state in which a liquid crystal display unit in a height disposition is mounted on a hold pedestal.

According to this, as shown in FIG. 7C and FIG. 8A, when the liquid crystal display unit 39 is mounted onto the hold pedestal 59 to be put into the width disposition, the dot-shape input terminal CT1 comes into contact with the curve-shape supply terminal 57A, while the dot-shape input terminal CT2 comes into contact with the curve-shape supply terminal 57B, so that the fluorescent lamp LP1 and the fluorescent lamp LP2 emit light.

Figure 7D:
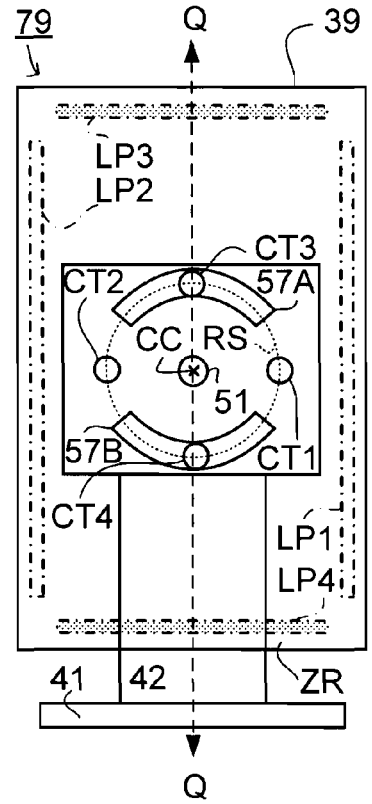
FIG. 7D is a plan view showing a state in which a liquid crystal display unit in a height disposition is mounted on a hold pedestal with the plan view of FIG. 7A and the plan view of FIG. 7B laid on each other.

Besides, as shown in FIG. 7D and FIG. 8C, when the liquid crystal display unit 39 is mounted onto the hold pedestal 59 to be put into the height disposition, the dot-shape input terminal CT3 comes into contact with the curve-shape supply terminal 57A, while the dot-shape input terminal CT4 comes into contact with the curve-shape supply terminal 57B, so that the fluorescent lamp LP3 and the fluorescent lamp LP4 emit light.

In addition, in the rotation process of the liquid crystal display unit 39, the curve-shape supply terminals 57A, 57B come into contact with any one of the input terminals CT1 to CT4. For example, as shown in FIG. 8B, there is also a case where the supply terminal 57A comes into contact with the input terminals CT1, CT3, while the supply terminal 57B comes into contact with the input terminals CT2, CT4. Besides, there is also a case where the supply terminal 57A comes into contact with any one of the input terminals CT1 to CT4, while the supply terminal 57B comes into contact with any one the remaining input terminals CT1 to CT4.

Because of this, in the process in which the liquid crystal display unit 39 is changed from the width disposition to the height disposition, there is no case where the fluorescent lamps LP1 to LP4 do not emit light at all. However, the measure to avoid the situation in which the fluorescent lamps LP1 to LP4 do not emit light at all is not limited to this.

An example of this is described by means of FIG. 9A to FIG. 9D and FIG. 10A to FIG. 10C. Here, the ways of representing FIG. 9A to FIG. 9D are the same as the ways of FIG. 5A to FIG. 5D; the ways of representing FIG. 10A to FIG. 10C are the same as the ways of FIG. 6A to FIG. 6C.

Figure 9A:
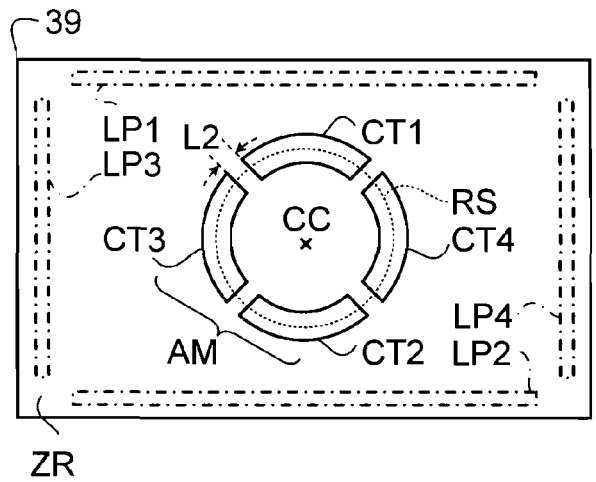
FIG. 9A is a plan view showing another example besides the examples of FIG. 5A and FIG. 7A.

FIG. 9A is similar to FIG. 7A: the input terminals CT1 to CT4 are circularly situated around the mount point CC on the rear surface ZR of the rear bezel BZ2 and away from each other at equal intervals on the circle RS. However, the input terminals CT1 to CT4 have a length corresponding to a predetermined length of the circumference of the circle RS; and away from each other on the circumference. Because of this, for example, as shown in FIG. 9A, the input terminals CT1 to CT4 are formed into a curve shape (bent shape).

Figure 9B:
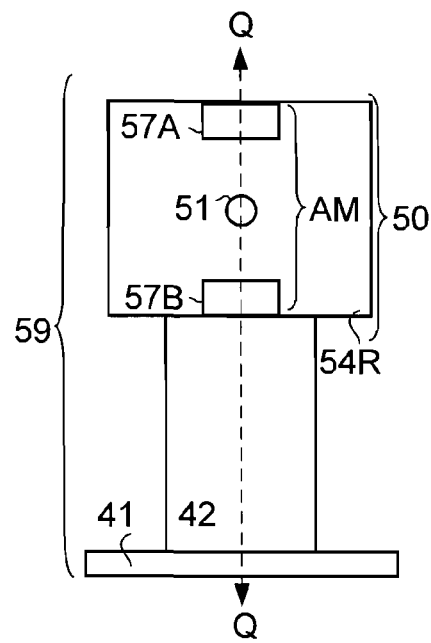
FIG. 9B is a plan view showing another example besides the examples of FIG. 5B and FIG. 7B.

On the other hand, FIG. 9B is similar to FIG. 7B: the supply terminals 57A, 57B are away from each other by about the same distance (i.e., the length of the diameter of the circle RS) between the input terminal CT1 and the input terminal CT2 and arranged in a line along the extending direction Q of the support strut 42 with the support shaft 51 centered. In addition, the supply terminals 57A, 57B have, for example, a length longer than a distance L2 between the different kinds of input terminal CT1 and input terminal CT3 on the circumference of the circle RS (in short, have a length that is able to cover at a time an end of the input terminal CT1 and an end of the input terminal CT3 that are different from each other in the kind and neighbor to each other on the circumference of the circle RS).

Because of this, for example, as shown in FIG. 9B, the supply terminals 57A, 57B are formed into a rectangular shape that has a long edge longer than the distance L2 between the input terminals CT1 and CT3. Here, the long-edge direction of the rectangular-shape supply terminal 57 intersects the extending direction Q of the support strut 42 (e.g., meets at right angles).

Figure 9C:
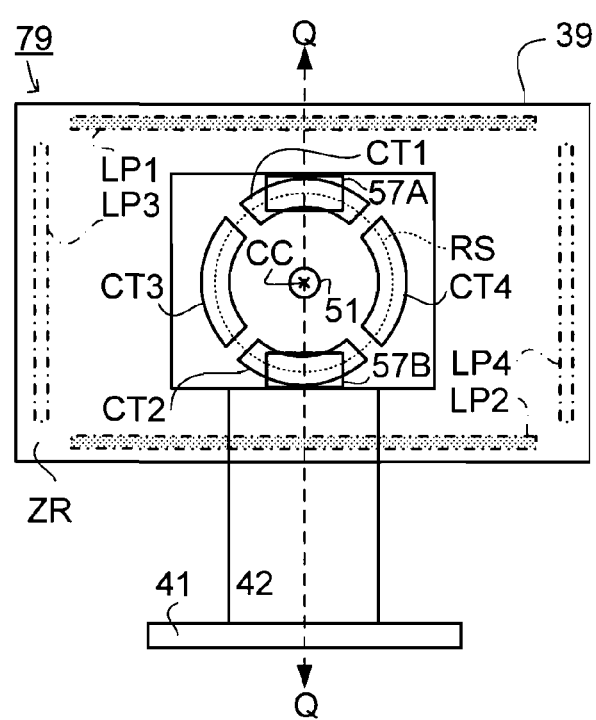
FIG. 9C is a plan view showing a state in which a liquid crystal display unit in a width disposition is mounted on a hold pedestal with the plan view of FIG. 9A and the plan view of FIG. 9B laid on each other.

According to this, as shown in FIG. 9C and FIG. 10A, when the liquid crystal display unit 39 is mounted onto the hold pedestal 59 to be put into the width disposition, the curve-shape input terminal CT1 comes into contact with the rectangular-shape supply terminal 57A, while the curve-shape input terminal CT2 comes into contact with the rectangular-shape supply terminal 57B, so that the fluorescent lamp LP1 and the fluorescent lamp LP2 emit light.

Figure 9D:
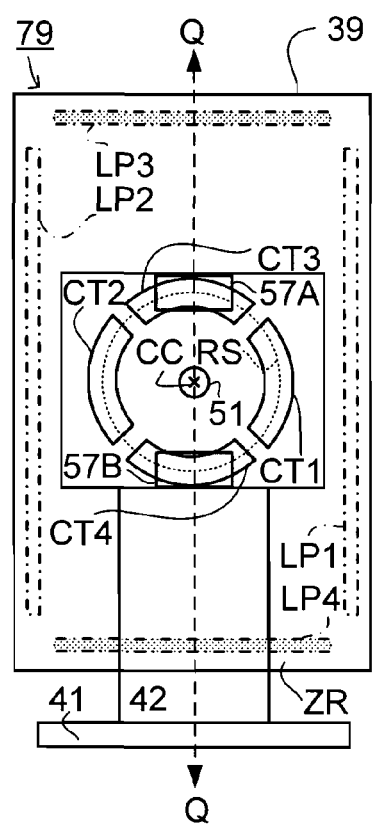
FIG. 9D is a plan view showing a state in which a liquid crystal display unit in a height disposition is mounted on a hold pedestal with the plan view of FIG. 9A and the plan view of FIG. 9B laid on each other.

Besides, as shown in FIG. 9D and FIG. 10C, when the liquid crystal display unit 39 is mounted onto the hold pedestal 59 to be put into the height disposition, the curve-shape input terminal CT3 comes into contact with the rectangular-shape supply terminal 57A, while the curve-shape input terminal CT4 comes into contact with the rectangular-shape supply terminal 57B, so that the fluorescent lamp LP3 and the fluorescent lamp LP4 emit light.

In addition, in the rotation process of the liquid crystal display unit 39, the supply terminals 57A, 57B come into contact with any one of the input terminals CT1 to CT4. For example, as shown in FIG. 10B, there is also a case where the supply terminal 57A comes into contact with the input terminals CT1, CT3, while the supply terminal 57B comes into contact with the input terminals CT2, CT4. Besides, there is also a case where the supply terminal 57A comes into contact with any one of the input terminals CT1 to CT4, while the supply terminal 57B comes into contact with any one the remaining input terminals CT1 to CT4.

Because of this, in the process in which the liquid crystal display unit 39 is changed from the width disposition to the height disposition, there is no case where the fluorescent lamps LP1 to LP4 do not emit light at all.

Embodiment 3

An embodiment 3 is described. Here, members that have the same functions as members used in the embodiments 1 and 2 are indicated by the same reference numbers and description of them is skipped.

In the liquid crystal display device 79 according to the embodiment 1, the rotation locus of the input terminals CT1, CT2 and the rotation locus of the input terminals CT3, CT4 overlie each other; the supply terminals 57A, 57B are so situated on the mount surface 54R as to overlap the rotation loci (in short, the circle RS) that overlie each other. However, the input terminals CT1 to CT4 and the supply terminals 57A, 57B are not limited to such disposition.

Another example of the liquid crystal display device 79 is described by means of FIG. 11A to FIG. 11D. Here, the ways of representing FIG. 11A to FIG. 11D are the same as the ways of FIG. 5A to FIG. 5D.

Figure 11A:
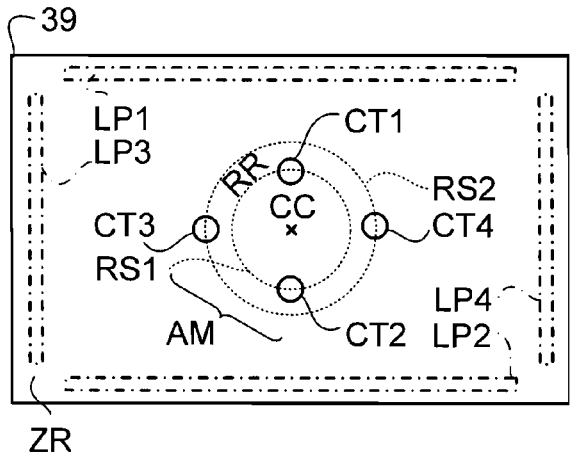
FIG. 11A is a plan view showing another example besides the examples of FIG. 5A, FIG. 7A, and FIG. 9A.

The input terminals CT1 to CT4 shown in FIG. 11A, like in FIG. 5A, correspond to the respective fluorescent lamps LP (LP1 to LP4) and four input terminals are arranged on the rear surface ZR of the rear bezel BZ2. Especially, the shortest distance from the input terminal CT1 to the mount point CC and the shortest distance from the input terminal CT2 to the mount point CC match each other; the shortest distance from the input terminal CT3 to the mount point CC and the shortest distance from the input terminal CT4 to the mount point CC match each other. However, the shortest distance from the input terminals CT1, CT2 to the mount point CC and the shortest distance from the input terminals CT3, CT4 to the mount point CC do not match each other.

Because of this, in the case where the liquid crystal display unit 39 rotates with respect to the hold pedestal 59, the rotation locus of the input terminal CT1 and the rotation locus of the input terminal CT2 match each other to form a circle RS1, while the rotation locus of the input terminal CT3 and the rotation locus of the input terminal CT4 match each other to form a circle RS2. And, the circles RS1 and RS2 have different radiuses (the shortest distance from the input terminal CT to the mount point CC). Accordingly, a circle that has a width formed by the distance between the circle RS1 and the circle RS2 is defined as a thick circle (dual rotation locus) RR.

Here, the input terminals CT1, CT2 are so arranged as to intersect (e.g., meet at right angles) the extending directions of the fluorescent lamps LP1, LP2; the input terminal CT3, CT4 are so arranged as to intersect (e.g., meet at right angles) the extending directions of the fluorescent lamps LP3, LP4.

Figure 11B:
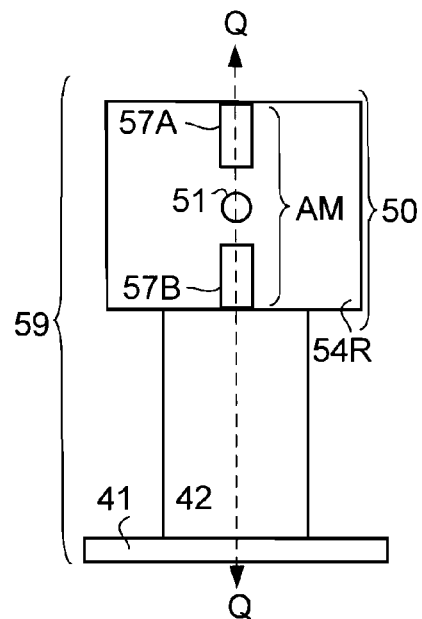
FIG. 11B is a plan view showing another example besides the examples of FIG. 5B and FIG. 7B and FIG. 9B.

On the other hand, on the hold pedestal 59, the supply terminals 57A, 57B are arranged in a line with the support shaft 51 centered. In detail, the supply terminals 57A, 57B have a length longer than the width (i.e., a difference length between the shortest distance from the input terminal CT1 to the mount point CC and the shortest distance from the input terminal CT3 to the mount point CC) of the thick circle RR; are away from each other by about the same length of the diameter of the thick circle RR; and are arranged along the extending direction Q of the support strut 42. Because of this, for example, as shown in FIG. 11B, the supply terminals 57A, 57B are formed into a rectangular shape that has a long edge along the extending direction Q.

Figure 11C:
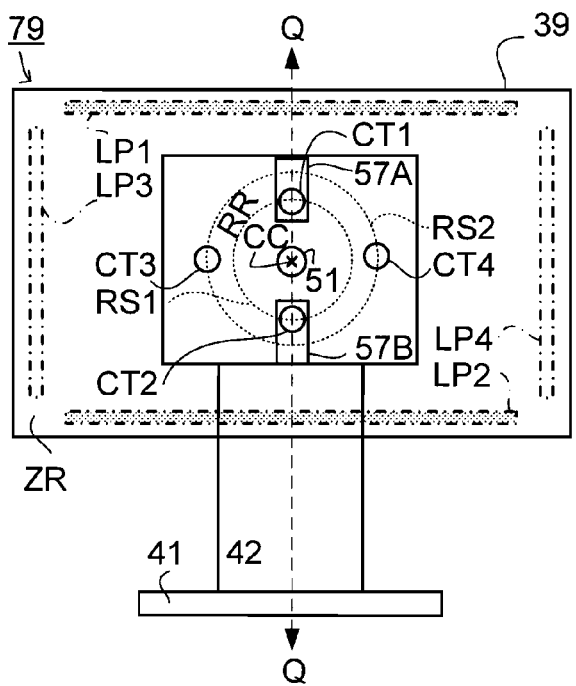
FIG. 11C is a plan view showing a state in which a liquid crystal display unit in a width disposition is mounted on a hold pedestal with the plan view of FIG. 11A and the plan view of FIG. 11B laid on each other.

According to this, as shown in FIG. 11C, when the liquid crystal display unit 39 is mounted onto the hold pedestal 59 to be put into the width disposition, the input terminal CT1 comes into contact with the supply terminal 57A, while the input terminal CT2 comes into contact with the supply terminal 57B. Because of this, the fluorescent lamp LP1 and the fluorescent lamp LP2 that are parallel to the base 41 of the hold pedestal 59 emit light. In other words, when the base 41 is placed horizontally, only the fluorescent lamps LP1, LP2 that are so disposed as to intersect (e.g., meet at right angles) the gravity direction emit light.

Figure 11D:
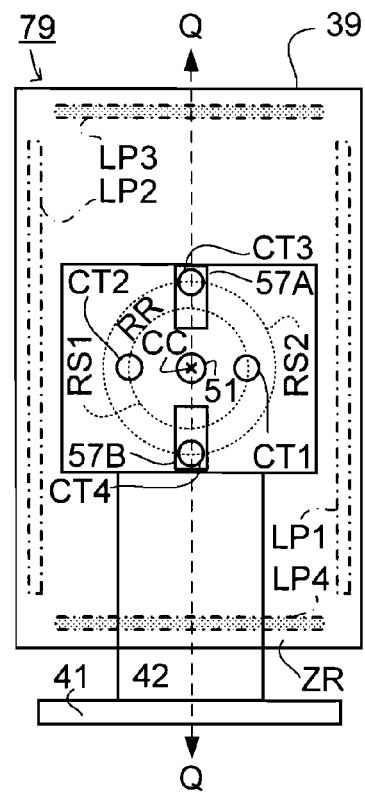
FIG. 11D is a plan view showing a state in which a liquid crystal display unit in a height disposition is mounted on a hold pedestal with the plan view of FIG. 11A and the plan view of FIG. 11B laid on each other.

On the other hand, as shown in FIG. 11D, when the liquid crystal display unit 39 is mounted onto the hold pedestal 59 to be put into the height disposition, the input terminal CT3 comes into contact with the supply terminal 57A, while the input terminal CT4 comes into contact with the supply terminal 57B. Because of this, the fluorescent lamp LP3 and the fluorescent lamp LP4 that are parallel to the base 41 of the hold pedestal 59 emit light. In other words, when the base 41 is placed horizontally, only the fluorescent lamps LP3, LP4 that are so disposed as to intersect (e.g., meet at right angles) the gravity direction emit light.

In other words, the fluorescent lamp LP1 and the fluorescent lamp LP2, like in the embodiment 1, emit light when the liquid crystal display unit 39 is put in the width disposition. Besides, the fluorescent lamp LP3 and the fluorescent lamp LP4, like in the embodiment 1, emit light when the liquid crystal display unit 39 is put in the height disposition.

Because of this, only the fluorescent lamp LP that intersects (e.g., meets at right angles) the gravity direction emits light; and during the light emission of the fluorescent lamp LP, the mercury in the inside of the fluorescent lamp LP does not collect on either end of both ends of the fluorescent lamp LP. Because of this, on one of the electrodes situated at both ends of the fluorescent lamp LP, a mercury shortage does not occur; and a situation, in which because of a mercury shortage, the brightness becomes low at one end side of the fluorescent lamp LP, and deterioration of the electrodes are prevented.

Here, even in the liquid crystal display device 79 according to the embodiment 3, the rotation angle of the fluorescent lamp LP to the hold pedestal 59 is measured by means of contact between the input terminal CT formed on the rear surface ZR of the rear bezel BZ2 and the supply terminal 57 formed on the mount surface 54R of the main base 54 of the hold pedestal 59. Accordingly, of course, the input terminal CT and the supply terminal 57 in the liquid crystal display device 79 according to the embodiment 3 are also able to be called the angle measurement type light-emission control portion AM.

Embodiment 4

An embodiment 4 is described. Here, members that have the same functions as members used in the embodiments 1 to 3 are indicated by the same reference numbers and description of them is skipped.

In the embodiment 3, the rotation locus of the input terminals CT1, CT2, which appears in the case where the liquid crystal display unit 39 rotates with respect to the hold pedestal 59, forms the circle RS1, while the rotation locus of the input terminals CT3, CT4 forms the circle RS2. And, in the case where the liquid crystal display unit 39 is mounted on the hold pedestal 59, on the mount surface 54R of the main base 54 of the hold pedestal 59, the supply terminal 57 is so situated as to overlap the circle RS1 and the circle RS2 that are the rotation loci (i.e, so situated as to overlap the thick circle RR).

In detail, the shortest distance (the radius length of the circle RS1) from the input terminals CT1, CT2 to the mount point CC and the shortest distance from the input terminals CT3, CT4 to the mount point CC do not match each other, so that the rotation locus of the input terminals CT1, CT2 and the rotation locus of the input terminals CT3, CT4 do not overlie each other. However, the thick circle RR is formed by the distance between the circle RS1 and the circle RS2 that do not overlie each other. Because of this, on the mount surface 54R, the supply terminals 57A, 57B are away from each other but so situated as to overlap the thick circle RR.

In such liquid crystal display device 79, the process in which the liquid crystal display unit 39 is changed from the width disposition to the height disposition is shown in FIG. 12A to FIG. 12C that are represented in the same way of FIG. 6A to FIG. 6C.

As shown in FIG. 12A, in a case where the liquid crystal display unit 39 is in the width disposition, the input terminals CT1, CT2 come into contact with the supply terminals 57A, 57B, so that an electric current flows into the fluorescent lamps LP1, LP2 and the fluorescent lamps LP1, LP2 emit light. Besides, as shown in FIG. 12C, in a case where the liquid crystal display unit 39 is in the height disposition, the input terminals CT3, CT4 come into contact with the supply terminals 57A, 57B, so that an electric current flows into the fluorescent lamps LP3, LP4 and the fluorescent lamps LP3, LP4 emit light.

However, as shown in FIG. 12B, in the process in which the liquid crystal display unit 39 is changed from the width disposition to the height disposition, the fluorescent lamps LP1 to LP4 do not emit light at all. Here, the liquid crystal display device 79 that prevents such a situation is described by means of FIG. 13A to FIG. 13D and FIG. 14A to FIG. 14C. Incidentally, the ways of representing FIG. 13A to FIG. 13D are the same as the ways of FIG. 5A to FIG. 5D; the ways of representing FIG. 14A to FIG. 14C are the same as the ways of FIG. 6A to FIG. 6C.

Figure 13A:
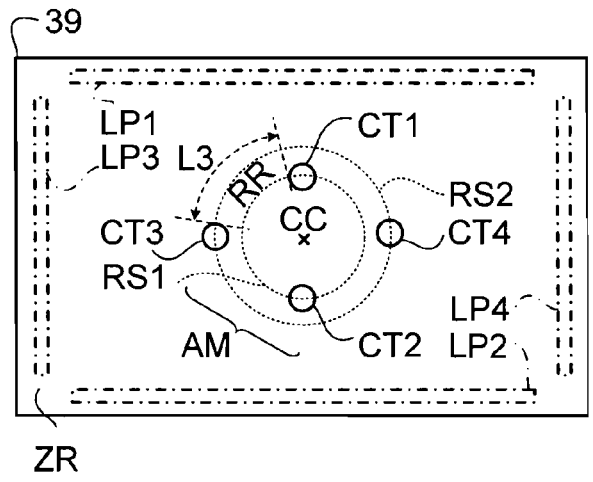
FIG. 13A is the same plan view as that of FIG. 11A.
Figure 14A:
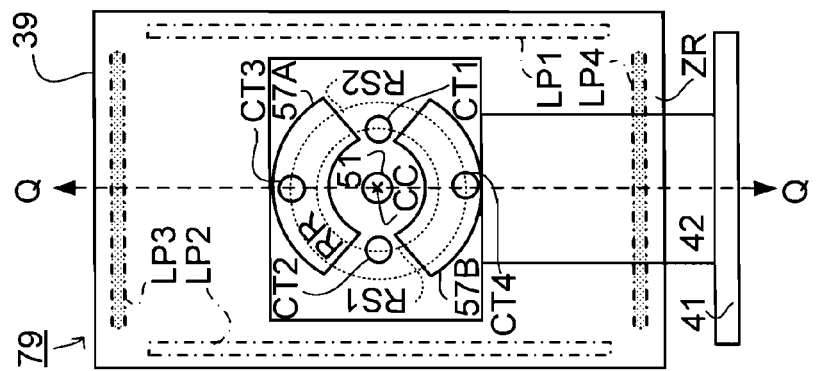
FIG. 14A is a plan view showing the plan view of FIG. 13A and the plan view of FIG. 13B that are laid on each other, that is, a plan view showing a state in which a liquid crystal display unit in a width disposition is mounted on a hold pedestal.
Figure 14B:
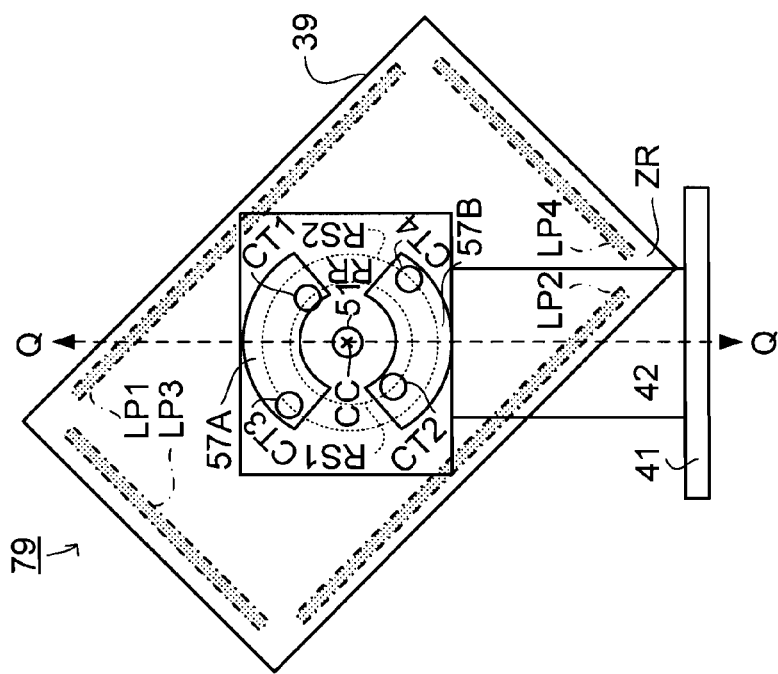
FIG. 14B is a plan view showing the plan view of FIG. 13A and the plan view of FIG. 13B that are laid on each other, that is, a plan view showing a state in which a liquid crystal display unit in an oblique disposition is mounted on a hold pedestal.
Figure 14C:
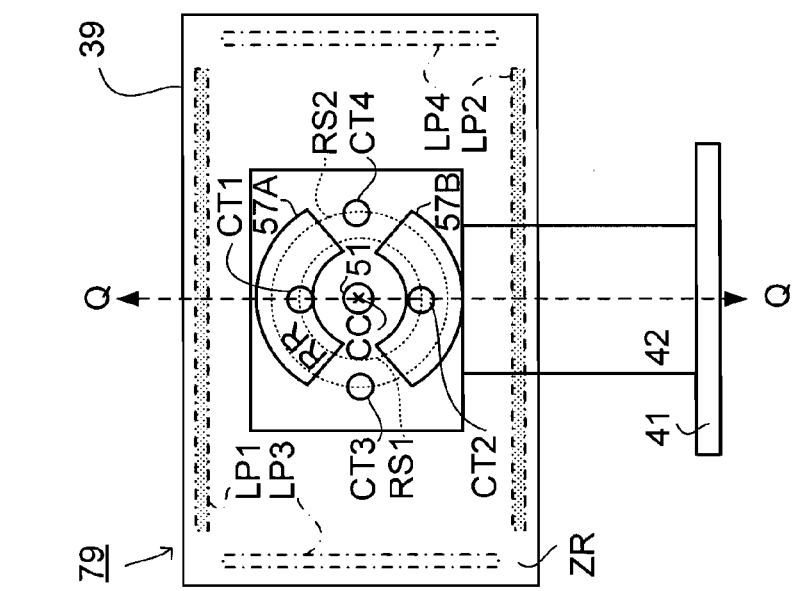
FIG. 14C is a plan view showing the plan view of FIG. 13A and the plan view of FIG. 13B that are laid on each other, that is, a plan view showing a state in which a liquid crystal display unit in a height disposition is mounted on a hold pedestal.

FIG. 13A is completely the same as FIG. 11A: the input terminals CT1, CT2 are so arranged as to intersect the extending directions of the fluorescent lamps LP1, LP2; the input terminals CT3, CT4 are so arranged as to intersect the extending directions of the fluorescent lamps LP3, LP4.

Here, the shortest distance from the input terminal CT1 and the input terminal CT2 to the mount point CC and the shortest distance from the input terminal CT3 and the input terminal CT4 to the mount point CC are different from each other. Because of this, in the case where the liquid crystal display unit 39 rotates with respect to the hold pedestal 59, the circle RS1 that is the rotation locus of the input terminal CT1 and the input terminal CT2 and the circle RS2 that is the rotation locus of the input terminal CT3 and the input terminal CT4 have different radiuses. However, the thick circle RR arises from the distance between the circle RS1 and the circle RS2.

Figure 13B:
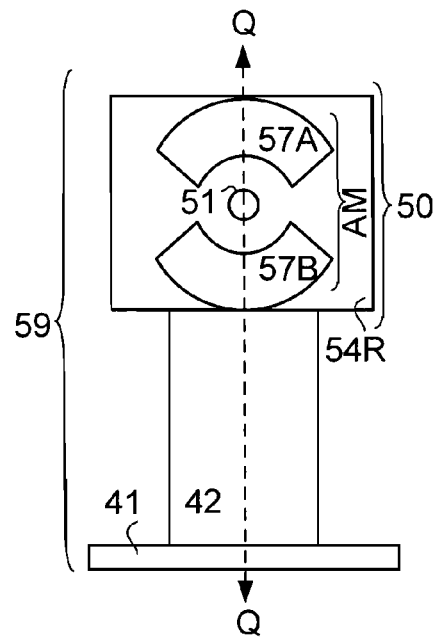
FIG. 13B is a plan view showing another example besides the examples of FIG. 5B, FIG. 7B, FIG. 9B and FIG. 11B.

On the other hand, FIG. 13B is similar to FIG. 11B: the supply terminals 57A, 57B are away from each other by about the same length of the diameter of the thick circle RR and arranged in a line along the extending direction Q of the support strut 42 with the support shaft 51 centered. In addition, the supply terminals 57A, 57B have a length corresponding to a predetermined length of a circumference of the thick circle RR; and the predetermined length is longer than a distance L3 between the neighboring and different kinds of input terminal CT1 and input terminal CT3 on the circumference of the thick circle RR (in short, have a length that is able to cover at a time an end of the input terminal CT1 and an end of the input terminal CT3 that are different from each other in the kind and neighbor to each other on the circumference of the thick circle RR). Because of this, for example, as shown in FIG. 13B, the supply terminal 57 is formed into a curve shape.

Figure 13C:
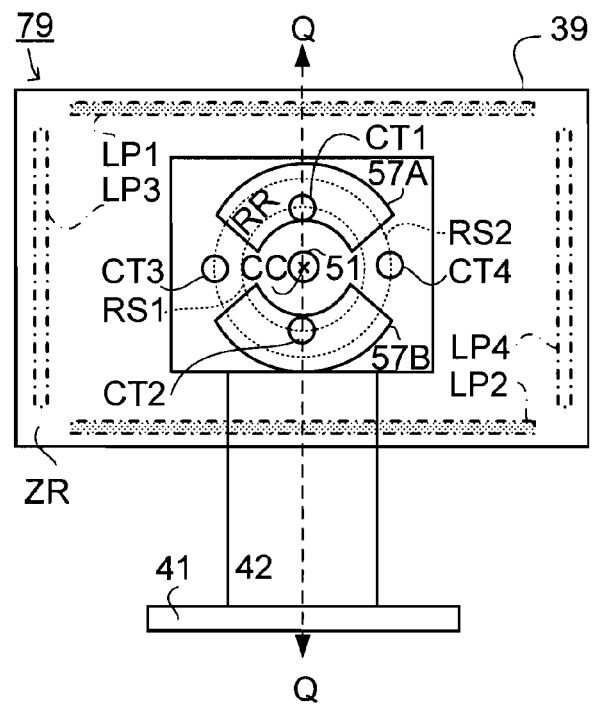
FIG. 13C is a plan view showing a state in which a liquid crystal display unit in a width disposition is mounted on a hold pedestal with the plan view of FIG. 13A and the plan view of FIG. 13B laid on each other.

According to this, as shown in FIG. 13C and FIG. 14A, when the liquid crystal display unit 39 is mounted onto the hold pedestal 59 to be put into the width disposition, the input terminal CT1 comes into contact with the curve-shape supply terminal 57A, while the input terminal CT2 comes into contact with the curve-shape supply terminal 57B, so that the fluorescent lamp LP1 and the fluorescent lamp LP2 emit light.

Figure 13D:
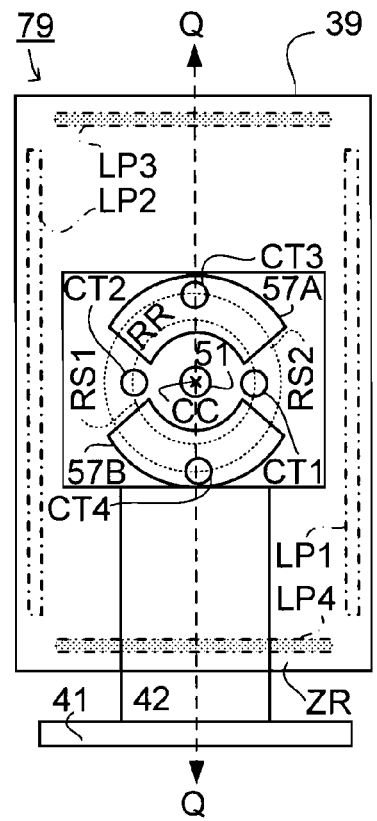
FIG. 13D is a plan view showing a state in which a liquid crystal display unit in a height disposition is mounted on a hold pedestal with the plan view of FIG. 13A and the plan view of FIG. 13B laid on each other.

Besides, as shown in FIG. 13D and FIG. 14C, when the liquid crystal display unit 39 is mounted onto the hold pedestal 59 to be put into the height disposition, the input terminal CT3 comes into contact with the curve-shape supply terminal 57A, while the input terminal CT4 comes into contact with the curve-shape supply terminal 57B, so that the fluorescent lamp LP3 and the fluorescent lamp LP4 emit light.

In addition, in the rotation process of the liquid crystal display unit 39, the curve-shape supply terminals 57A, 57B come into contact with any one of the input terminals CT1 to CT4. For example, as shown in FIG. 14B, there is also a case where the supply terminal 57A comes into contact with the input terminals CT1, CT3, while the supply terminal 57B comes into contact with the input terminals CT2, CT4. Besides, there is also a case where the supply terminal 57A comes into contact with any one of the input terminals CT1 to CT4, while the supply terminal 57B comes into contact with any one the remaining input terminals CT1 to CT4.

Because of this, in the process in which the liquid crystal display unit 39 is changed from the width disposition to the height disposition, there is no case where the fluorescent lamps LP1 to LP4 do not emit light at all. However, the measure to avoid the situation in which the fluorescent lamps LP1 to LP4 do not emit light at all is not limited to this.

Figure 15A:
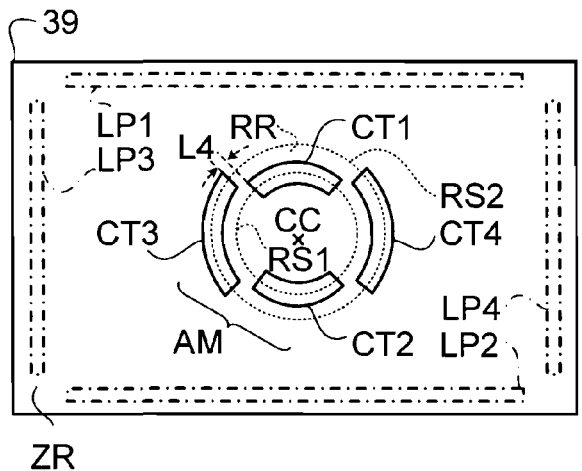
FIG. 15A is a plan view showing another example besides the examples of FIG. 5A, FIG. 7A, FIG. 9A, FIG. 11A and FIG. 13A.
Figure 15B:
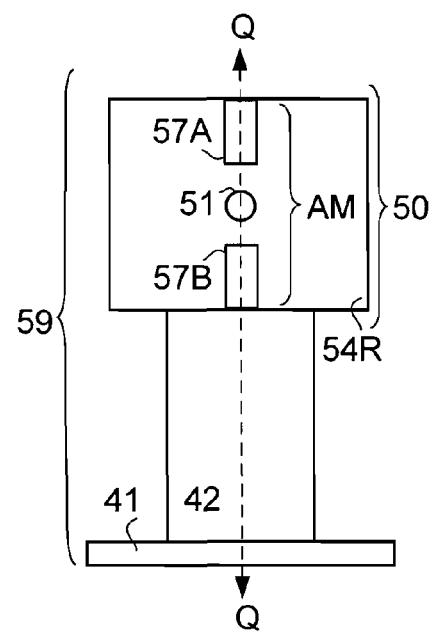
FIG. 15B is a plan view showing another example besides the examples of FIG. 5B, FIG. 7B, FIG. 9B, FIG. 11B and FIG. 13B.
Figure 15C:
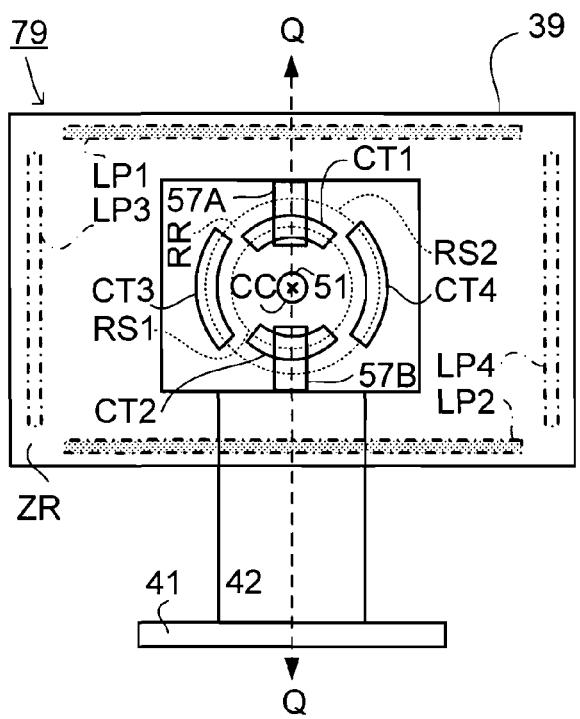
FIG. 15C is a plan view showing a state in which a liquid crystal display unit in a width disposition is mounted on a hold pedestal with the plan view of FIG. 15A and the plan view of FIG. 15B laid on each other.
Figure 15D:
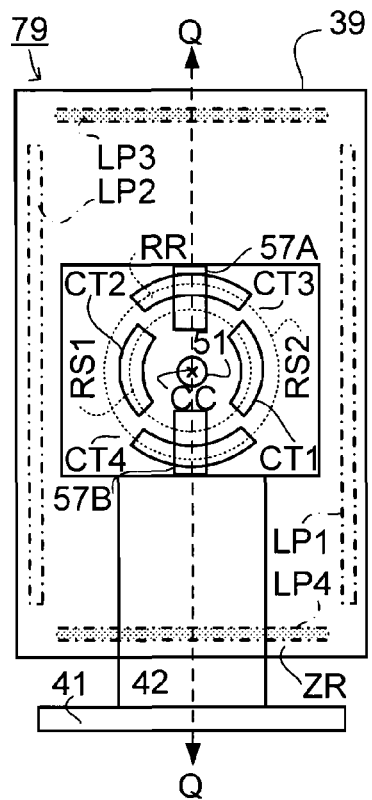
FIG. 15D is a plan view showing a state in which a liquid crystal display unit in a height disposition is mounted on a hold pedestal with the plan view of FIG. 15A and the plan view of FIG. 15B laid on each other.
Figure 16A:
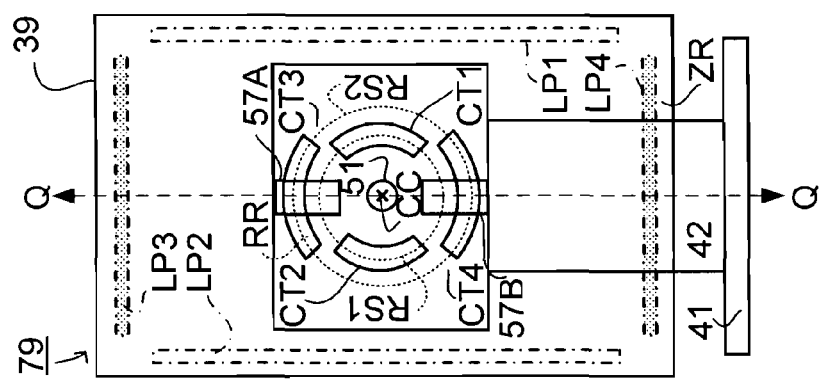
FIG. 16A is a plan view showing the plan view of FIG. 15A and the plan view of FIG. 15B that are laid on each other, that is, a plan view showing a state in which a liquid crystal display unit in a width disposition is mounted on a hold pedestal.
Figure 16B:
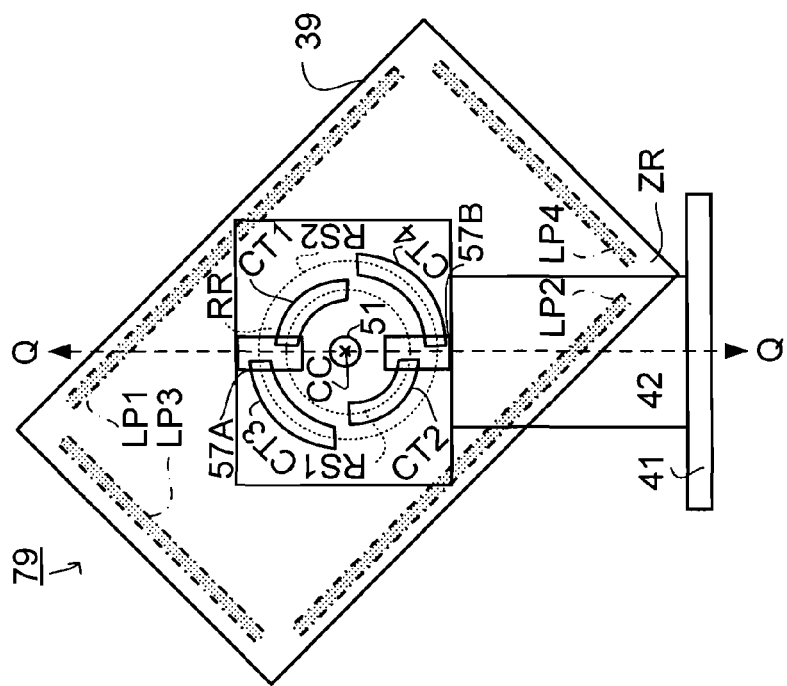
FIG. 16B is a plan view showing the plan view of FIG. 15A and the plan view of FIG. 15B that are laid on each other, that is, a plan view showing a state in which a liquid crystal display unit in an oblique disposition is mounted on a hold pedestal.
Figure 16C:
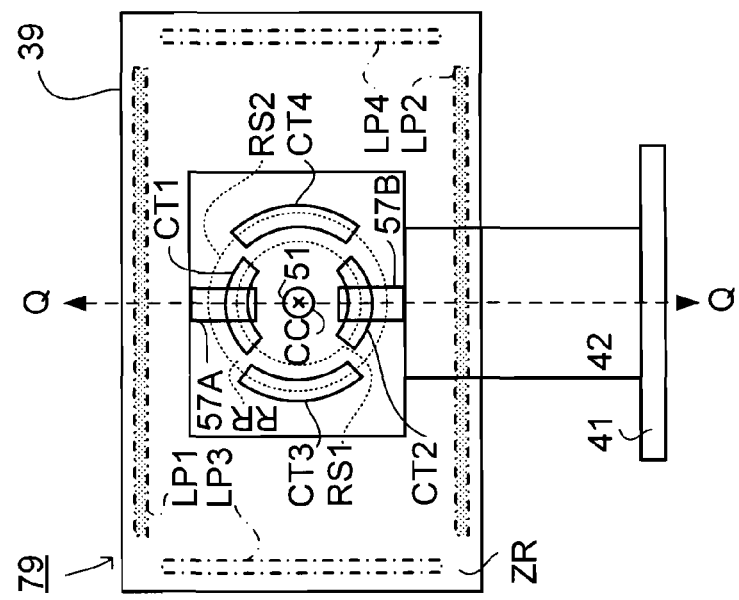
FIG. 16C is a plan view showing the plan view of FIG. 15A and the plan view of FIG. 15B that are laid on each other, that is, a plan view showing a state in which a liquid crystal display unit in a height disposition is mounted on a hold pedestal.

An example of this is described by means of FIG. 15A to FIG. 15D and FIG. 16A to FIG. 16C. Here, the ways of representing FIG. 15A to FIG. 15D are the same as the ways of FIG. 5A to FIG. 5D; the ways of representing FIG. 16A to FIG. 16C are the same as the ways of FIG. 6A to FIG. 6C.

FIG. 15A is similar to FIG. 13A: the input terminals CT1, CT2 are so arranged as to intersect the extending directions of the fluorescent lamps LP1, LP2 on the rear surface ZR of the rear bezel BZ2 with the mount point CC centered. However, the input terminals CT1, CT2 have a length corresponding to a predetermined length of a circumference of the circle RS1; and are away from each other on the circumference. Because of this, for example, as shown in FIG. 15A, the input terminals CT1, CT2 are formed into a curve shape.

Besides, the input terminals CT3, CT4 also are so arranged as to intersect the extending directions of the fluorescent lamps LP3, LP4 on the rear surface ZR of the rear bezel BZ2 with the mount point CC centered. However, the input terminals CT3, CT4 have a length corresponding to a predetermined length of a circumference of the circle RS2; and are away from each other on the circumference. Because of this, for example, as shown in FIG. 15A, the input terminals CT3, CT4 are formed into a curve shape.

On the other hand, FIG. 15B is similar to FIG. 13B: the supply terminals 57A, 57B are away from each other by about the same length of the diameter of the thick circle RR and arranged in a line along the extending direction Q of the support strut 42 with the support shaft 51 centered. In addition, the supply terminals 57A, 57B have, for example, a length longer than a distance L4 between the different kinds of input terminal CT1 and input terminal CT3 on the circumference of the thick circle RR (in short, have a length that is able to cover at a time an end of the input terminal CT1 and an end of the input terminal CT3 that are different from each other in the kind and neighbor to each other on the circumference of the thick circle RR). Because of this, for example, as shown in FIG. 15B, the supply terminal 57 is formed into a rectangular shape that has a long edge along the extending direction Q.

According to this, as shown in FIG. 15C and FIG. 16A, when the liquid crystal display unit 39 is mounted onto the hold pedestal 59 to be put into the width disposition, the curve-shape input terminal CT1 comes into contact with the rectangular-shape supply terminal 57A, while the curve-shape input terminal CT2 comes into contact with the rectangular-shape supply terminal 57B, so that the fluorescent lamp LP1 and the fluorescent lamp LP2 emit light.

Besides, as shown in FIG. 15D and FIG. 16C, when the liquid crystal display unit 39 is mounted onto the hold pedestal 59 to be put into the height disposition, the curve-shape input terminal CT3 comes into contact with the rectangular-shape supply terminal 57A, while the curve-shape input terminal CT4 comes into contact with the rectangular-shape supply terminal 57B, so that the fluorescent lamp LP3 and the fluorescent lamp LP4 emit light.

In addition, in the rotation process of the liquid crystal display unit 39, the supply terminals 57A, 57B come into contact with any one of the input terminals CT1 to CT4. For example, as shown in FIG. 16B, there is also a case where the supply terminal 57A comes into contact with the input terminals CT1, CT3, while the supply terminal 57B comes into contact with the input terminals CT2, CT4. Besides, there is also a case where the supply terminal 57A comes into contact with any one of the input terminals CT1 to CT4, while the supply terminal 57B comes into contact with any one the remaining input terminals CT1 to CT4.

Because of this, in the process in which the liquid crystal display unit 39 is changed from the width disposition to the height disposition, there is no case where the fluorescent lamps LP1 to LP4 do not emit light at all.

Other Embodiments

Here, the present invention is not limited to the above embodiments; and various modifications are possible without departing from the spirit of the present invention.

For example, the fluorescent lamp LP1 and the fluorescent lamp LP2 emit light in a case where the fluorescent lamp LP1 and the fluorescent lamp LP2 are situated at a rotation angle in a predetermined range (first angle range) to the hold pedestal 59 in such a way that the fluorescent lamp LP1 and the fluorescent lamp LP2 become parallel to a horizontal surface. Besides, the fluorescent lamp LP3 and the fluorescent lamp LP4 also emit light in a case where the fluorescent lamp LP3 and the fluorescent lamp LP4 are situated at a rotation angle in a predetermined range (second angle range) to the hold pedestal 59 in such a way that the fluorescent lamp LP3 and the fluorescent lamp LP4 become parallel to a horizontal surface.

And, as an example of the rotation angle in the predetermined range, considering the position of the hold pedestal 59 with the extending direction Q of the support strut 42 used as a reference, the angle range (a predetermined angle range including 90°), in which the fluorescent lamp LP meets the extending direction Q at nearly right angles, is described. However, this is not limiting. For example, there may be a case where the rotation angle of the fluorescent lamp LP to the extending direction Q is 90° only. In short, it is sufficient if the angle range is an angle range in which it is possible to identify whether the liquid crystal display unit 39 (in detail, the backlight unit 19) is in the width disposition or the height disposition.

Besides, the position of the input terminal CT, the position of the supply terminal 57, the number of input terminals CT and the number of supply terminals 57 are not limited to those shown; and are changeable variously.

In short, in a case where when the liquid crystal display unit 39 is put into the width disposition, if the input terminal CT corresponding to the fluorescent lamp LP that intersects the extending direction Q of the support strut 42 comes into contact with the supply terminal 57 of the hold pedestal 59; and in a case where when the liquid crystal display unit 39 is put into the height disposition, if the input terminal CT corresponding to the fluorescent lamp LP that intersects the extending direction Q of the support strut 42 comes into contact with the supply terminal 57 of the hold pedestal 59, the position of the input terminal CT, the position of the supply terminal 57, the number of input terminals CT and the number of supply terminals 57 are not especially limited.

Accordingly, for example, by unitarily forming the input terminals CT1 and CT2 corresponding to the fluorescent lamps LP1 and LP2 with each other and by unitarily forming the input terminals CT3 and CT4 corresponding to the fluorescent lamps LP3 and LP4 with each other, the number of input terminals CT may be reduced (the number of input terminals may be reduced from 4 to 2). Besides, the number of supply terminals 57 is not limited to 2, and may be one, three or more.

Besides, in the above description, the dot-, rectangular-, or curve-shape input terminals CT are described as examples; moreover, the dot-, rectangular-, or curve-shape supply terminals 57 are described as examples. However, the shapes of the input terminal CT and the supply terminal 57 are not limited to these.

In short, like the above description, in a case where when the liquid crystal display unit 39 is put into the width disposition, if the input terminal CT corresponding to the fluorescent lamp LP that intersects the extending direction of the support strut 42 comes into contact with the supply terminal 57 of the hold pedestal 59; and in a case where when the liquid crystal display unit 39 is put into the height disposition, if the input terminal CT corresponding to the fluorescent lamp LP that intersects the extending direction of the support strut 42 comes into contact with the supply terminal 57 of the hold pedestal 59, the position of the input terminal CT and the shape of the supply terminal 57 are not especially limited.

Here, in the above description, by means of contact between the input terminal CT and the supply terminals 57, the rotation angle of the liquid crystal display unit 39 to the hold pedestal 59 is measured; and an electric current is supplied to the fluorescent lamp LP. In other words, the input terminal CT and the supply terminal 57 have the functions to measure the rotation angle and to control the electric current for the fluorescent lamp LP. However, the angle measurement type light-emission control portion AM is not limited to this.

For example, in the liquid crystal display device 79, a control portion that performs comprehensive control of the entire liquid crystal display device 79; and an angle measurement sensor may be included, and these two members may serve as the angle measurement type light-emission control portion AM.

Even in such angle measurement type light-emission control portion AM, when the rotation angle measured by the angle measurement sensor falls in a predetermined angle range, the control portion makes the fluorescent lamps LP1, LP2 emit light; on the other hand, when the rotation angle measured by the angle measurement sensor falls in a predetermined angle range, the control portion makes the fluorescent lamps LP3, LP4 emit light.

Accordingly, in the liquid crystal display device 79, only the fluorescent lamp LP that intersects (e.g., meets at right angles) the gravity direction emits light; and during the light emission of the fluorescent lamp LP, the mercury in the inside of the fluorescent lamp LP does not collect on either end of both ends of the fluorescent lamp LP. Because of this, on one of the electrodes situated at both ends of the fluorescent lamp LP, a mercury shortage does not occur; and a situation, in which because of a mercury shortage, the brightness becomes low at one end side of the fluorescent lamp LP, and deterioration of the electrodes are prevented.

Here, in the above description, the device that includes the liquid crystal display unit 39 and the hold pedestal 59 is the liquid crystal display device 79. However, it is also possible to construe that in the liquid crystal display device 79, a device which includes the backlight unit 19 and the hold pedestal 59 is included. Here, such device that includes the backlight unit 19 and the hold pedestal 59 is called a light emitting device 69.

LIST OF REFERENCE SYMBOLS

LP fluorescent lamp (linear light source)
LP1 fluorescent lamp (first linear light source)
LP2 fluorescent lamp (first linear light source)
LP3 fluorescent lamp (second linear light source)
LP4 fluorescent lamp (second linear light source)
CT input terminal
CT1 input terminal (first input terminal)
CT2 input terminal (first input terminal)
CT3 input terminal (second input terminal)
CT4 input terminal (second input terminal)
CC mount point of support shaft (rotation center point)
19 backlight unit
BZ bezel
BZ1 front bezel
BZ2 rear bezel (a component of backlight unit)
ZR rear surface (rotation surface) of rear bezel
CT input terminal
RS circle (rotation locus)
RS1 circle (rotation locus)
RS2 circle (rotation locus)
RR thick circle (rotation locus, dual rotation locus)
11 light guide plate
12 reflection sheet
13 diffusion sheet
14 optical sheet
15 optical sheet
P pile-up direction
29 liquid crystal display panel
39 liquid crystal display unit
41 base
42 support strut
Q extending direction of support strut
50 rotary unit
51 support shaft
54 main body of rotary unit
54R mount surface (hold surface) of main body for supporting support shaft
57 supply terminal
AM angle measurement type light-emission control portion
59 hold pedestal 69 light emitting device
79 liquid crystal display device

The invention claimed is:

1. A light emitting device comprising:
a backlight unit that supplies light; and
a hold pedestal that hold rotatably the backlight unit; wherein a plurality of linear light sources in the backlight unit include a first linear light source and a second linear light source that are so disposed as to intersect each other;
an angle measurement type light-emission control portion, which detects a rotation angle of the backlight unit to the hold pedestal; and in accordance with the rotation angle, controls light emission of the linear light source, is included;
a surface of the backlight unit that faces the hold pedestal is a rotation surface and a surface of the hold pedestal that faces the rotation surface is a hold surface;
the angle measurement type light-emission control portion includes a first detection portion and a second detection portion which have a relationship in which one of the first and second detection portions detects the other of the first and second detection portions; disposes the first detection portion on the rotation surface and disposes the second detection portion on the hold surface; and detects the rotation angle by detecting the other of the first and second detection portions by using the one of the first and second detection portions; and
the angle measurement type light-emission control portion, on measuring a first angle range which is a rotation angle in a predetermined range corresponding to the hold pedestal, makes the first linear light source emit light; on the other hand, on measuring a second angle range which is a rotation angle in a predetermined range corresponding to the hold pedestal, makes the second linear light source emit light.

2. The light emitting device according to claim 1, wherein the first detection portion includes: a first input terminal which is an input terminal for an electric current that is supplied to the first linear light source; and a second input terminal which is an input terminal for an electric current that is supplied to the second liner light source; and
the second detection portion is a supply terminal for flowing an electric current into the input terminal.

3. The light emitting device according to claim 2, wherein when a locus of the input terminal that appears in a case where the backlight unit rotates with respect to the hold pedestal is a rotation locus, the supply terminal overlaps the rotation locus on the hold surface.

4. The light emitting device according to claim 3, wherein when a rotation center of the backlight unit that rotates is a rotation center point, a shortest distance from the first input terminal to the rotation center point and a shortest distance from the second input terminal to the rotation center point match each other, so that a rotation locus of the first input terminal and a rotation locus of the second input terminal overlie each other; and
the supply terminal is so situated as to overlap the overlying rotation loci on the hold surface.

5. The light emitting device according to claim 4, wherein the supply terminal has a length corresponding to a predetermined length of a circumference of the overlying rotation loci; and the predetermined length is a length that covers at a time an end of the first input terminal and an end of the second input terminal which neighbor to each other on the circumference of the rotation loci.

6. The light emitting device according to claim 4, wherein the first input terminal and the second input terminal have a length corresponding to a predetermined length of a circumference of the overlying rotation loci; and away from each other on the circumference; and
the supply terminal has a length that covers at a time an end of the first input terminal and an end of the second input terminal which neighbor to each other on the circumference of the rotation loci.

7. The light emitting device according to claim 3, wherein when a rotation center of the backlight unit that rotates is a rotation center point, a shortest distance from the first input terminal to the rotation center point and a shortest distance from the second input terminal to the rotation center point are different from each other, so that a rotation locus of the first input terminal and a rotation locus of the second input terminal are different from each other; and
the supply terminal has a length longer than a line width of a dual rotation locus formed between the different rotation loci; and is so situated as to overlap the dual rotation locus on the hold surface.

8. The light emitting device according to claim 7, wherein the supply terminal has a length corresponding to a predetermined length of a circumference of the dual rotation locus; and the predetermined length is a length that covers at a time an end of the first input terminal and an end of the second input terminal which neighbor to each other on the circumference of the dual rotation locus.

9. The light emitting device according to claim 7, wherein the first input terminal has a length corresponding to a predetermined length of a circumference of the rotation locus of itself;
the second input terminal has a length corresponding to a predetermined length of a circumference of the rotation locus of itself; and
the supply terminal has a length that covers at a time an end of the first input terminal and an end of the second input terminal which neighbor to each other on the circumference of the dual rotation locus.

10. The light emitting device according to claim 1, wherein the angle measurement type light-emission control portion includes: an angle measurement unit that detects the rotation angle of the backlight unit to the hold pedestal; and a light-emission control unit that controls light emission of the linear light source in accordance with the rotation angle;
the light-emission control unit makes the first linear light source emit light when the rotation angle measured by the angle control unit falls in the first angle range; on the other hand, makes the second linear light source emit light when the rotation angle measured by the angle control unit falls in the second angle range.

11. A liquid crystal display device comprising:
the light emitting device according to claim 1; and
a liquid crystal display panel that receives light from the backlight unit of the light emitting device.

* * * * *